United States Patent
Chen et al.

(10) Patent No.: US 11,654,945 B2
(45) Date of Patent: May 23, 2023

(54) SAFE AND RELIABLE METHOD, DEVICE, AND SYSTEM FOR REAL-TIME SPEED MEASUREMENT AND CONTINUOUS POSITIONING

(71) Applicant: CRRC ZHUZHOU ELECTRIC LOCOMOTIVE RESEARCH INSTITUTE CO., LTD., Hunan (CN)

(72) Inventors: Gaohua Chen, Hunan (CN); Jianghua Feng, Hunan (CN); Shu Cheng, Hunan (CN); Rongjun Ding, Hunan (CN); Chaoqun Xiang, Hunan (CN); Yijing Xu, Hunan (CN); Liang Han, Hunan (CN)

(73) Assignee: CRRC ZHUZHOU ELECTRIC LOCOMOTIVE RESEARCH INSTITUTE CO., LTD., Hunan (CN)

( * ) Notice: Subject to any disclaimer, the term of this patent is extended or adjusted under 35 U.S.C. 154(b) by 769 days.

(21) Appl. No.: 16/488,162

(22) PCT Filed: Mar. 16, 2017

(86) PCT No.: PCT/CN2017/076926
§ 371 (c)(1),
(2) Date: Aug. 22, 2019

(87) PCT Pub. No.: WO2018/152899
PCT Pub. Date: Aug. 30, 2018

(65) Prior Publication Data
US 2021/0129880 A1    May 6, 2021

(30) Foreign Application Priority Data
Feb. 22, 2017  (CN) .......................... 201710096583.6

(51) Int. Cl.
| | | |
|---|---|---|
| *B61L 25/02* | (2006.01) | |
| *B60L 13/06* | (2006.01) | |
| *G01C 21/16* | (2006.01) | |

(52) U.S. Cl.
CPC ............. *B61L 25/021* (2013.01); *B60L 13/06* (2013.01); *B61L 25/025* (2013.01); *G01C 21/165* (2013.01); *B61L 2205/04* (2013.01)

(58) Field of Classification Search
CPC .. B61L 25/021; B61L 25/025; B61L 2205/04; B61L 25/026; B60L 13/06; G01C 21/165; G01P 7/00
See application file for complete search history.

(56) References Cited

U.S. PATENT DOCUMENTS

| | | | | |
|---|---|---|---|---|
| 2009/0043504 A1* | 2/2009 | Bandyopadhyay | .... | G01C 17/38 701/469 |
| 2010/0312461 A1 | 12/2010 | Haynie et al. | | |

(Continued)

FOREIGN PATENT DOCUMENTS

| | | |
|---|---|---|
| CN | 1715827 A | 1/2006 |
| CN | 101159091 A | 4/2008 |

(Continued)

OTHER PUBLICATIONS

CN101159091A translate.*

(Continued)

*Primary Examiner* — Tyler J Lee
*Assistant Examiner* — Yufeng Zhang
(74) *Attorney, Agent, or Firm* — Yue (Robert) Xu; Apex Attorneys at Law, LLP

(57) ABSTRACT

A method, a device and a system for safely and reliably performing real-time speed measurement and continuous positioning are provided. With the method, inertial navigation data from an inertial navigation signal source arranged (Continued)

in a train is detected, and correction data from a correction signal source is detected. In a case that no correction data is detected, a current speed and a current position of the train is determined based on the inertial navigation data, and in a case that the correction data is detected, the inertial navigation data is corrected with the correction data, and a current speed and position of the train are determined based on the corrected inertial navigation data. Therefore, even in the case that no correction data is detected, the real-time speed measurement and continuous positioning can be performed safely and reliably based on the inertial navigation data.

15 Claims, 38 Drawing Sheets

(56) References Cited

U.S. PATENT DOCUMENTS

| | | | | |
|---|---|---|---|---|
| 2013/0238237 | A1* | 9/2013 | Abramson Liani | G01C 21/12 701/472 |
| 2013/0331121 | A1* | 12/2013 | Bandyopadhyay | G01C 21/12 455/456.1 |
| 2014/0129136 | A1* | 5/2014 | Celia | G01C 21/00 701/472 |
| 2016/0339934 | A1 | 11/2016 | Chung | |
| 2017/0011222 | A1* | 1/2017 | Li | G06F 21/78 |

FOREIGN PATENT DOCUMENTS

| | | |
|---|---|---|
| CN | 101476894 A | 7/2009 |
| CN | 102445176 A | 5/2012 |
| CN | 102607596 A | 7/2012 |
| CN | 103017764 A | 4/2013 |
| CN | 103754235 A | 4/2014 |
| CN | 103770808 A | 5/2014 |
| CN | 104527451 A | 4/2015 |
| CN | 104724145 A | 6/2015 |
| KR | 20140137815 A | 12/2014 |
| RU | 2242392 C2 | 12/2004 |
| RU | 2280579 C1 | 7/2006 |
| RU | 2288856 C2 | 12/2006 |
| RU | 95850 U1 | 7/2010 |
| RU | 2394716 C1 | 7/2010 |
| RU | 2503567 C1 | 1/2014 |

OTHER PUBLICATIONS

International Search Report for PCT/CN2017/076926 dated Nov. 1, 2017, ISA/CN.
CNIPA First Office Action corresponding to Application No. 201710096583.6; dated Nov. 23, 2018.
The Russian 1st Office Action dated Mar. 10, 2020 for Application No. RU2019129510.

* cited by examiner

SAFE AND RELIABLE METHOD, DEVICE, AND SYSTEM FOR REAL-TIME SPEED MEASUREMENT AND CONTINUOUS POSITIONING

The present application is the national phase of International Patent Application No. PCT/CN2017/076926, titled "SAFE AND RELIABLE METHOD, DEVICE, AND SYSTEM FOR REAL-TIME SPEED MEASUREMENT AND CONTINUOUS POSITIONING", filed on Mar. 16, 2017, which claims priority to Chinese Patent Application No. 201710096583.6, titled "SAFE AND RELIABLE METHOD, DEVICE, AND SYSTEM FOR REAL-TIME SPEED MEASUREMENT AND CONTINUOUS POSITIONING", filed on Feb. 22, 2017 with the Chinese Patent Office, both of which are incorporated herein by reference in their entireties.

FIELD

The present disclosure relates to the technical field of rail transportations, and in particular to a method, a device and a system for safely and reliably performing real-time speed measurement and continuous positioning.

BACKGROUND

With the rapid development of technologies regarding rail transportations, high-speed trains have become a common choice for traveling in people's daily life. Conventional high-speed trains are capable of travelling at a speed up to 300 km/h. However, it is difficult to further increase the speed of the trains due to wheel/rail adhesion and other factors. It is generally recognized in the field that super high-speed trains travelling at a speed of greater than 400 km/h may only be implemented relying on the magnetic levitation technology.

For a conventional maglev train, the speed of the maglev train is measured via an induction stator pole, and the maglev train is positioned via an induction encoder. The speed of the maglev train is measured via the induction stator pole in the following way that stator poles are arranged along a rail at a certain distance interval, and the speed is measured via induction stator pole signal sources. A low speed is measured based on a rising edge and a failing edge of a signal, and a high speed is measured by counting received pulses. The maglev train is positioned in the following way that induction encoder signal sources are arranged along the rail at a certain distance interval, to perform absolute positioning of the train, and relative positioning is performed in a section between two induction encoders based on an integration of accumulated speeds detected via induction stator poles.

It has been found by researches that speed information and position information obtained in the above ways are discontinuous in time, failing to achieve real-time speed measurement and continuous positioning, thus failing to meet the requirement for real-time speed measurement and continuous positioning for a super high-speed maglev train. Further, once a fault occurs in the stator pole, the speed measurement cannot be performed. Similarly, once a fault occurs in the induction encoder, the positioning cannot be performed either.

Therefore, a problem to be solved by those skilled in the art is how to provide a method, a device and a system for safely and reliably performing real-time speed measurement and continuous positioning.

SUMMARY

A method for safely and reliably performing real-time speed measurement and continuous positioning is provided according to the present disclosure. With this method, the real-time speed measurement and continuous positioning may be performed safely and reliably based on correction data and inertial navigation data in a case that the correction data is detected, and even in a case that the correction data is not detected, the real-time speed measurement and continuous positioning may also be performed safely and reliably based on the inertial navigation data, which leads to high stability, safety and accuracy. A device for safely and reliably performing real-time speed measurement and continuous positioning as well as a system for safely and reliably performing real-time speed measurement and continuous positioning which includes the device are further provided according to the present disclosure.

In order to solve the above technical problem, a method for safely and reliably performing real-time speed measurement and continuous positioning is provided according to the present disclosure, which includes:

detecting inertial navigation data from an inertial navigation signal source arranged in a train, and detecting correction data from a correction signal source, where the correction signal source comprises a satellite signal source arranged in the train, and the correction data comprises satellite data; and determining, in a case that no correction data is detected, a current speed and a current position of the train based on the inertial navigation data, and correcting, in a case that the correction data is detected, the inertial navigation data by using the correction data and determining a current speed and a current position of the train based on the corrected inertial navigation data.

Preferably, the method further includes: transmitting the current speed and the current position.

Preferably, the correction data further comprises: speed data from a stator pole signal source arranged on a rail for the train; and/or position data from an induction encoder arranged on the rail for the train.

In the case that no satellite data is detected, the correcting the inertial navigation data by using the correction data includes: correcting speed data in the inertial navigation data by using the speed data from the stator pole signal source; and/or correcting position data in the inertial navigation data by using the position data from the induction encoder. In the case that the satellite data is detected, the correcting the inertial navigation data by using the correction data includes: correcting speed data in the inertial navigation data by using the speed data from the stator pole signal source and the satellite data; and/or correcting position data in the inertial navigation data by using the position data from the induction encoder and the satellite data.

Preferably, the correcting speed data in the inertial navigation data by using the speed data from the stator pole signal source and the satellite data includes: correcting, at a predetermined correction time interval, the speed data in the inertial navigation data by using a corrected speed as an initial speed in a current speed data correcting process, where the corrected speed is obtained based on a current satellite signal speed and a current pole signal speed.

Preferably, the correcting position data in the inertial navigation data by using the position data from the induction encoder and the satellite data includes: correcting, at a predetermined correction time interval, the position data in the inertial navigation data by using a corrected position as an initial position in a current position data correcting process, where the corrected position is obtained based on a current satellite signal position and a current induction encoder position.

Preferably, the number of the stator pole signal source is more than one, and the more than one stator pole signal source is arranged to form a double two-vote-two security structure; and/or the number of the induction encoder is more than one, and the more than one induction encoder is arranged to form a double two-vote-two security structure.

Preferably, the number of the inertial navigation signal source is more than one, and the more than one inertial navigation signal source is arranged to form a two-out-of-three selecting security structure; and the number of the satellite signal source is more than one, and the more than one satellite signal source is arranged to form a two-out-of-three selecting security structure.

Preferably, a security algorithm adopted in the two-out-of-three selecting security structure is a Kalman filtering method-based multi-source data fusion security algorithm for performing speed measurement and poisoning or an iteration correction method-based multi-source data fusion security algorithm for performing speed measurement and poisoning.

Preferably, the number of the inertial navigation signal source is four, and the number of the satellite signal source is four.

Preferably, the four satellite signal sources are respectively implemented by a BeiDou satellite chipset, a GPS satellite chipset, a GLONASS satellite chipset and a Galileo satellite chipset.

In order to solve the above technical problem, a device for safely and reliably performing real-time speed measurement and continuous positioning is further provided according to the present disclosure. The device includes an inertial navigation signal processor, a correction signal processor and a fusion processor. The inertial navigation signal processor is configured to detect inertial navigation data from an inertial navigation signal source arranged in a train. The correction signal processor is configured to detect correction data from a correction signal source. The correction signal source includes a satellite signal source arranged in the train. The correction data includes satellite data. The correction signal processor includes a satellite signal processor. The fusion processor is configured to determine, in a case that no correction data is detected, a current speed and a current position of the train based on the inertial navigation data, and correct, in a case that the correction data is detected, the inertial navigation data by using the correction data and determine a current speed and a current position of the train based on the corrected inertial navigation data.

Preferably, the correction signal processor further includes an external signal processor.

In a case that no satellite data is detected, the fusion processor is further configured to correct the inertial navigation data by using the correction data in the following steps of: correcting speed data in the inertial navigation data by using the speed data from the stator pole signal source; and/or correcting position data in the inertial navigation data by using the position data from the induction encoder. In a case that the satellite data is detected, the fusion processor is further configured to correct the inertial navigation data by using the correction data in the following steps of: correcting speed data in the inertial navigation data by using the speed data from the stator pole signal source and the satellite data; and/or correcting position data in the inertial navigation data by using the position data from the induction encoder and the satellite data.

Preferably, the device further includes a communication processor, which is configured to transmit the current speed and the current position.

In order to solve the above technical problem, a system for safely and reliably performing real-time speed measurement and continuous positioning is further provided according to the present disclosure. The system includes an inertial navigation signal source, a correction signal source and the above described device for safely and reliably performing real-time speed measurement and continuous positioning.

Preferably, the number of the inertial navigation signal source is more than one, and the more than one inertial navigation signal source is arranged to form a two-out-of-three selecting security structure; and the number of the satellite signal source is more than one, and the more than one satellite signal source is arranged to form a two-out-of-three selecting security structure.

Preferably, the number of the inertial navigation signal source is four, and the number of the satellite signal source is four.

Preferably, the four satellite signal sources are respectively implemented by a BeiDou satellite chipset, a GPS satellite chipset, a GLONASS satellite chipset and a Galileo satellite chipset.

A method, a device and a system for safely and reliably performing real-time speed measurement and continuous positioning are provided according to the present disclosure. The method for safely and reliably performing real-time speed measurement and continuous positioning includes: detecting inertial navigation data from an inertial navigation signal source arranged in a train, and detecting correction data from a correction signal source, where the correction signal source includes a satellite signal source arranged in the train, and the correction data includes satellite data; and determining, in a case that no correction data is detected, a current speed and a current position of the train based on the inertial navigation data, and correcting, in a case that the correction data is detected, the inertial navigation data by using the correction data and determining a current speed and a current position of the train based on the corrected inertial navigation data.

It can be seen from the present disclosure that, the inertial navigation data and the correction data are both detected, and a way to obtain the current speed and the current position of the train is determined by taking the inertial navigation data as a reference data depending on a result on whether the correction data is detected. In a case that the correction data is detected, the real-time speed measurement and continuous positioning can be performed safely and reliably based on the correction data and the inertial navigation data. Even in a case that no correction data is detected, the real-time speed measurement and continuous positioning can be performed safely and reliably based on the inertial navigation data. In this way, high stability, security and accuracy can be achieved.

BRIEF DESCRIPTION OF THE DRAWINGS

In order to more clearly describe the technical solution in the embodiments of the present disclosure or the technical solution in the conventional technology, drawings to be used in the description of the embodiments of the present disclosure or the conventional technology are briefly described hereinafter. It is apparent that the drawings described below show merely the embodiments of the present disclosure, and those skilled in the art may obtain other drawings according to the provided drawings without any creative effort.

DETAILED DESCRIPTION OF THE EMBODIMENTS

Figure 1:
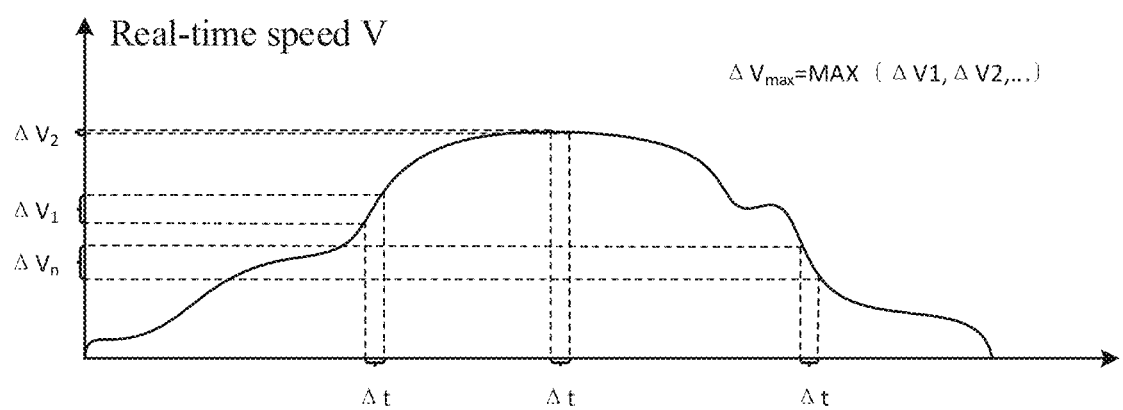
FIG. 1 is a schematic diagram showing a principle for performing real-time speed measurement according to the present disclosure.

A method for safely and reliably performing real-time speed measurement and continuous positioning is provided according to the present disclosure. With this method, the real-time speed measurement and continuous positioning may be performed safely and reliably based on correction data and inertial navigation data in a case that the correction data is detected, and even in a case that the correction data is not detected, the real-time speed measurement and continuous positioning may also be performed safely and reliably based on the inertial navigation data, which leads to high stability, safety and accuracy. A device for safely and reliably performing real-time speed measurement and continuous positioning as well as a system for safely and reliably performing real-time speed measurement and continuous positioning which includes the above device are further provided according to the present disclosure.

In order to make objects, technical solutions and advantages in embodiments of the present disclosure more clear, technical solutions in the embodiments of the present disclosure are clearly and completely described with reference to the drawings in the embodiments of the present disclosure hereinafter. It is apparent that the described embodiments are only some rather than all of the embodiments of the present disclosure. Any other embodiments obtained by those skilled in the art based on the embodiments in the present disclosure without any creative work should fall within the protection scope of the present disclosure.

Before making the technical solutions of the present disclosure, the following six solutions are analyzed.

In solution 1, a speed sensor is used. A traveling speed of a train is obtained by counting pulses via a speed sensor at an end of a shaft of a swivel wheel pair (or a rotary motor). However, a maglev train is provided with no swivel wheel pair (or no rotary motor), thus no speed sensor is provided.

In solution 2, a method for performing positioning using a query transponder is used. Query transponders are arranged along a rail at a certain distance interval to detect an absolute position of the train. Each time the train passes one query transponder, an absolute position of the train is obtained. A position of the train between two query transponders is obtained. In this solution, it is required to arrange query transponders along the rail at a distance interval of 1 km as well as at each turnout and each rail crossing. Since there are many ground devices, it is unfavorable to maintain those devices. Further, there is no query transponder capable of positioning a train traveling at a speed greater than 400 km/h.

In solution 3, a method for performing positioning by using a rail circuit is used. A rail is divided into multiple sections, and a current sending device and a current receiving device are respectively arranged at two ends of each of the multiple sections, to form an information transmission loop with the rail. When the train enters a section, a rail circuit is short-circuited by wheels, thus the information cannot be transmitted to a receiving end, thereby performing detection and positioning on the train. This method has a disadvantage that a length of the rail circuit severs as a minimum measurement unit, thus failing to form a real-sense moving block and detect the speed of the train.

In solution 4, a photoelectric speed sensor is used. Light emitting devices are arranged along the rail and a receiving sensor is arranged in the train. The speed of the train is measured by counting received pulses. In this solution, it is required to arrange additional accessories and it is easily affected by an external environment, thus this solution is unsuitable for a super high-speed measurement and positioning system.

In solution 5, the speed is measured via an induction stator pole. With an induction stator pole signal source, a low speed is measured based on a rising edge and a failing edge of a signal, and a high speed is measured by counting received pulses.

In solution 6, an induction encoder is used to perform absolute positioning. Induction encoder signal sources are arranged along the rail at a certain distance interval to perform absolute positioning on the train. In a section between two induction encoders, relative positioning is performed through an integration of accumulated speeds measured by using the induction stator pole.

For the description of the speed measurement with an induction stator pole and the absolute positioning with an induction encoder, reference may be made to the background part, which is not repeated herein.

Although the above solutions are analyzed, those solutions are not adopted due to various disadvantages in each of the above solutions. Based on this, a method, a device and a system for safely and reliably performing real-time speed measurement and continuous positioning are provided.

Before describing the method, the device and the system for safely and reliably performing real-time speed measurement and continuous positioning according to the present disclosure, the real-time speed measurement and the continuous positioning are described.

Reference is made to FIG. 1, which is a schematic diagram showing a principle for performing real-time speed measurement according to the present disclosure.

The real-time speed measurement indicates that a time period $\Delta t$ from a time when a speed signal source is inputted to a time when a speed measuring result is outputted meets a time requirement of a real-time control system, that is, $\Delta t \leq \Delta t$ max, and a maximum change amount $\Delta V$ max of the speed during the time period $\Delta t$ meets a requirement of the real-time control system, that is, $\Delta Vt \leq \Delta V$ max.

Figure 2:
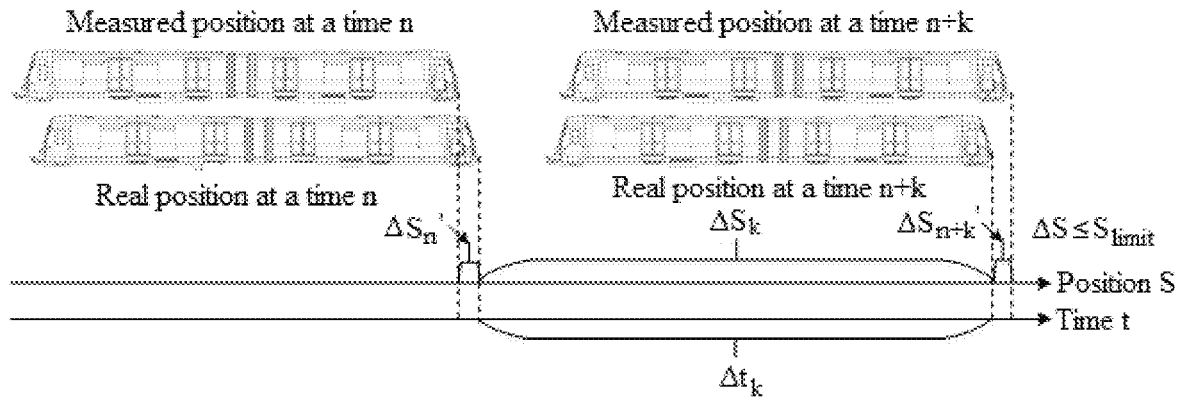
FIG. 2 is a schematic diagram showing a principle for performing continuous positioning according to the present disclosure.

Reference is made to FIG. 2, which is a schematic diagram showing a principle for performing continuous positioning according to the present disclosure.

A distance difference $\Delta S$ between two positioning points adjacent in time meets a requirement of the real-time control system, that is, $\Delta S \leq \Delta S$ max, and a position deviation $\Delta S'$ between a positioning point and a real position corresponding to the positioning point meets a requirement of the real-time control system, that is, $\Delta S' \leq \Delta S'$ max.

Figure 3:
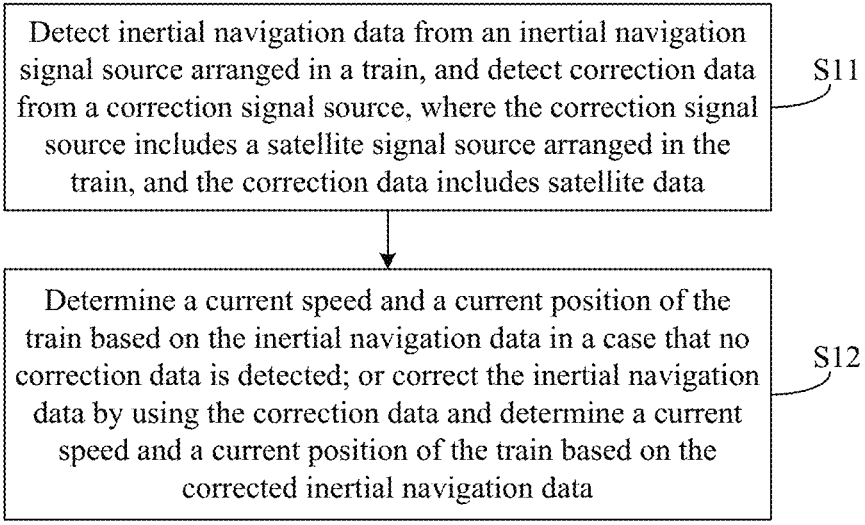
FIG. 3 is a flowchart of a method for safely and reliably performing real-time speed measurement and continuous positioning according to the present disclosure.

Reference is made to FIG. 3, which is a flowchart of a method for safely and reliably performing real-time speed measurement and continuous positioning according to the present disclosure. The method includes the following steps S11 to S12.

In step S11, inertial navigation data from an inertial navigation signal source arranged in a train is detected, and correction data from a correction signal source is detected. The correction signal source includes a satellite signal source arranged in the train. The correction data includes satellite data.

Specifically, it is required to arrange the correction signal source in advance, and arrange the inertial navigation signal source in the train in advance. The correction signal source includes the satellite signal source. Accordingly, the correction data includes the satellite data.

In addition, from a perspective of cost, there may be one correction signal source and one inertial navigation signal source. From perspectives of positioning accuracy, security and reliability, there may be multiple correction signal sources and multiple inertial navigation signal sources. The number of the correction signal source and the number of the inertial navigation signal source are not limited herein, which may be determined according to actual conditions.

In practice, the inertial navigation data (including an accelerated speed information, an angular speed information and the like) from the inertial navigation signal source and the correction data from the correction signal source are detected.

In step S12, in a case that no correction data is detected, a current speed and a current position of the train are determined based on the inertial navigation data. In a case that the correction data is detected, the inertial navigation data is corrected by using the correction data, and a current speed and a current position of the train are determined based on the corrected inertial navigation data.

The correction signal source includes the satellite signal source. The correction data includes the satellite data. Since the satellite signal source is sensitive to the external environment and a fault of a satellite, the performance of the satellite signal source may be deteriorated in a case that a fault occurs in the satellite or the train is in certain environment. For example, in a case that the satellite signal source is a global positioning system (GPS) and the train passes through a tunnel group, no satellite signal is detected, and the GPS cannot provide any satellite data, thus the speed measurement and the positioning may not be performed based on the satellite data.

Compared with the correction signal source, the inertial navigation signal source is stable and is not affected by the external environment, thus the inertial navigation data is always detected in spite of a change of an environment that the train is located. Therefore, in a case that no correction data is detected, the current speed and the current position of the train are determined based on the inertial navigation data, and in a case that the correction data is detected, the inertial navigation data is corrected by using the correction data, thereby obtaining secure and reliable current speed and current position of the train.

A method for safely and reliably performing real-time speed measurement and continuous positioning are provided according to the present disclosure, which includes: detecting inertial navigation data from an inertial navigation signal source arranged in a train, and detecting correction data from a correction signal source, where the correction signal source includes a satellite signal source arranged in the train, and the correction data includes satellite data; and determining, in a case that no correction data is detected, a current speed and a current position of the train based on the inertial navigation data, and correcting, in a case that the correction data is detected, the inertial navigation data by using the correction data and determining a current speed and a current position of the train based on the corrected inertial navigation data.

It can be seen from the present disclosure that, the inertial navigation data and the correction data are both detected, and a way of obtaining the current speed and the current position of the train is determined by taking the inertial navigation data as a reference data depending on a result on whether the correction data is detected. In a case that the correction data is detected, the real-time speed measurement and continuous positioning can be performed safely and reliably based on the correction data and the inertial navigation data. Even in a case that no correction data is detected, the real-time speed measurement and continuous positioning can be performed safely and reliably based on the inertial navigation data. In this way, high stability, security and accuracy can be achieved.

Preferably, the method further includes: transmitting the current speed and the current position. After the current speed and the current position is obtained, the current speed and the current position of the train may be encoded and transmitted to a communication interface circuit in response to a request from an external device, thereby realizing data sharing.

Further, in order to facilitate an operator to timely know the current speed and the current position of the train, the current speed and the current position are further transmitted to another device after being obtained, for being displayed on a display screen or being broadcasted.

Preferably, the correction data further includes speed data from a stator pole signal source arranged on a rail for the train, and/or position data from an induction encoder arranged on a rail for the train.

In a case that no satellite data is detected, the inertial navigation data is corrected by using the correction data by performing steps of: correcting speed data in the inertial navigation data by using the speed data from the stator pole signal source, and/or correcting position data in the inertial navigation data by using the position data from the induction encoder. In a case that the satellite data is detected, the inertial navigation data is corrected by using the correction data by performing steps of: correcting speed data in the inertial navigation data by using the speed data from the stator pole signal source and the satellite data, and/or correcting position data in the inertial navigation data by using the position data from the induction encoder and the satellite data.

In order to further improve the accuracy, security and reliability of the speed measurement and the positioning of the train, since many rails are arranged with stator poles and/or induction encoder signal sources and the train is provided with the stator pole signal source and the induction encoder accordingly, the inertial navigation data may be corrected by using the speed data obtained from the stator pole signal source and the position data obtained from the induction encoder.

Specifically, since the satellite signal source is sensitive to the external environment, it is required to consider the case whether the satellite data is detected when correcting the inertial navigation data by using the correction data. In a case that the satellite data is detected, the speed data in the inertial navigation data is corrected by using the speed data from the stator pole signal source and the speed data in the satellite data, and/or the position data in the inertial navigation data is corrected by using the position data from the induction encoder and the position data in the satellite data. In this way, the accuracy, the security and the reliability of the speed measurement and the positioning for the train may be further improved.

The way of correcting the speed data in the inertial navigation data by using the speed data from the stator pole signal source and the speed data in the satellite data, and/or correcting the position data in the inertial navigation data by using the position data from the induction encoder and the position data in the satellite data is not limited in the present disclosure.

Preferably, the correcting the speed data in the inertial navigation data by using the speed data from the stator pole signal source and the satellite data includes: correcting, at a predetermined correction time interval, the speed data in the inertial navigation data by using a corrected speed obtained based on a current satellite signal speed and a current pole signal speed as an initial speed in a current speed data correcting process.

Specifically, in a case of detecting the speed of the train, the current satellite signal speed and the current pole signal speed are obtained at the predetermined correction time interval, and the corrected speed is obtained based on the satellite signal speed and the pole signal speed. The corrected speed indicates a current speed of the train. During the predetermined correction time interval, the speed of the train is obtained based on the corrected speed in combination with an accelerated speed and time in the inertial navigation data.

It is to be noted that a way of obtaining the corrected speed based on the satellite signal speed and the pole signal speed is not limited herein. For example, an average of the satellite signal speed and the pole signal speed may be calculated as the corrected speed, or a weighted average of the satellite signal speed and the pole signal speed may be calculated as the corrected speed, or the corrected speed may be obtained in another way, which is not limited herein and may be determined according to actual conditions.

In addition, the predetermined correction time interval is determined based on requirement for accuracy and continuity of the speed or the position in considering the number of the satellite and a condition of the train. Therefore, the time interval may be changed depending on various factors. Since there is a refreshing time interval in the case of detecting the speed and the position of the train, the predetermined correction time interval is set such that a speed and a position obtained when refreshing operation is performed in any predetermined correction time interval, that is, a speed and a position at a refreshing time, are within an allowable range of error.

An example is described below to facilitate understanding. In the example, a time t1 is set as a starting time of a current predetermined correction time interval, and a time t2 is set as an ending time of the current predetermined correction time interval, that is, a starting time of a next predetermined correction time interval. It is to be understood that a speed and a position obtained at a refreshing time of the time t1 or the time t2 have highest accuracy and minimum error, and a speed and a position obtained at a refreshing time between the time t1 and the time t2 may have certain errors due to features of an inertial navigation system, however, those errors are in the allowable range. It is to be noted that, the predetermined correction time interval is very short, which may even be considered as being real-time.

Preferably, the correcting position data in the inertial navigation data by using the position data from the induction encoder and the satellite data includes: correcting, at a predetermined correction time interval, the position data in the inertial navigation data by using a corrected position obtained based on a current satellite signal position and a current induction encoder position as an initial position in a current position data correcting process.

Similar to the above way of correcting the speed, in a case of positioning the train, the current satellite signal position and the current induction encoder position are obtained at the predetermined correction time interval, and a corrected position is obtained based on the satellite signal position and the induction encoder position. The corrected position indicates a position of the train at the current time. During the predetermined correction time interval, the position of the train is obtained based on the corrected position in combination with the accelerated speed and time in the inertial navigation data.

It is to be noted that a way for obtaining the corrected position based on the satellite signal position and the pole signal position is not limited herein. For example, an average of the satellite signal position and the pole signal position may be calculated as the corrected position or a weighted average of the satellite signal position and the pole signal position may be calculated as the corrected position, or the corrected position may be obtained in another way, which is not limited herein and may be determined according to actual conditions.

In addition, it is to be noted that the predetermined correction time interval for the position of the train may be equal or not equal to the predetermined correction time interval for the speed of the train, which may be determined according to actual conditions.

Preferably, the number of the stator pole signal source is more than one, and the more than one stator pole signal source is arranged to form a double two-vote-two security structure; and/or the number of the induction encoder is more than one, and the more than one induction encoder is arranged to form a double two-vote-two security structure.

As described in the above, many trains are provided with the stator pole signal sources and the induction encoders. In order to improve the accuracy, security and reliability in speed measurement and positioning for the train, there may be multiple stator pole signal sources and multiple induction encoders. The multiple stator pole signal sources are arranged to form a double two-vote-two security structure according to a security structure principle. An original speed and a decision speed of a real-time speed are outputted by the double two-vote-two security structure. The multiple induction encoders may also arranged to form a double two-vote-two security structure. An original position and a decision position of a continuous position are outputted by the double two-vote-two security structure.

Since there are multiple stator pole signal sources and multiple induction encoders, even one or several of the stator pole signal sources and the induction encoders are failed, the inertial navigation data is still corrected by using the remaining normal stator pole signal sources and induction encoders.

The multiple stator pole signal sources and the multiple induction encoders may also be respectively arranged to form other security structures, for example, a two-out-of-multiple (greater than three) selecting security structure, a multiple(equal to or greater than three)—out-of-multiple (greater than three) selecting security structure, which is not limited herein and may be determined according to actual conditions.

Preferably, the number of the inertial navigation signal source is more than one, and the more than one inertial navigation signal source is arranged to form a two-out-of-three selecting security structure. The number of the satellite signal source is more than one, and the more than one satellite signal source is arranged to form a two-out-of-three selecting security structure.

In order to improve the accuracy, security and reliability in speed measurement and positioning for the train, there may be multiple inertial navigation signal sources and multiple satellite signal sources. The multiple inertial navigation signal sources are arranged to form a two-out-of-three selecting security structure according to the security structure principle. An original speed and a decision speed of a real-time speed are outputted by the two-out-of-three selecting security structure. The multiple satellite signal sources may also be arranged to form a two-out-of-three selecting security structure according to the security structure principle. An original position and a decision position of a continuous position are outputted by the two-out-of-three selecting security structure.

Since there are multiple satellite signal sources and multiple inertial navigation signal sources, even one or several of the satellite signal sources and the inertial navigation signal sources are failed, the speed and position of the train are also obtained based on remaining normal satellite signal sources and inertial navigation signal sources.

The multiple satellite signal sources and the multiple inertial navigation signal sources may also be arranged to form other security structures, which is not limited herein and may be determined according to actual conditions.

Preferably, the two-out-of-three selecting security structure adopts a Kalman filtering method-based multi-source data fusion security algorithm for performing speed measurement and poisoning or an iteration correction method-based multi-source data fusion security algorithm for performing speed measurement and poisoning.

Figure 4:
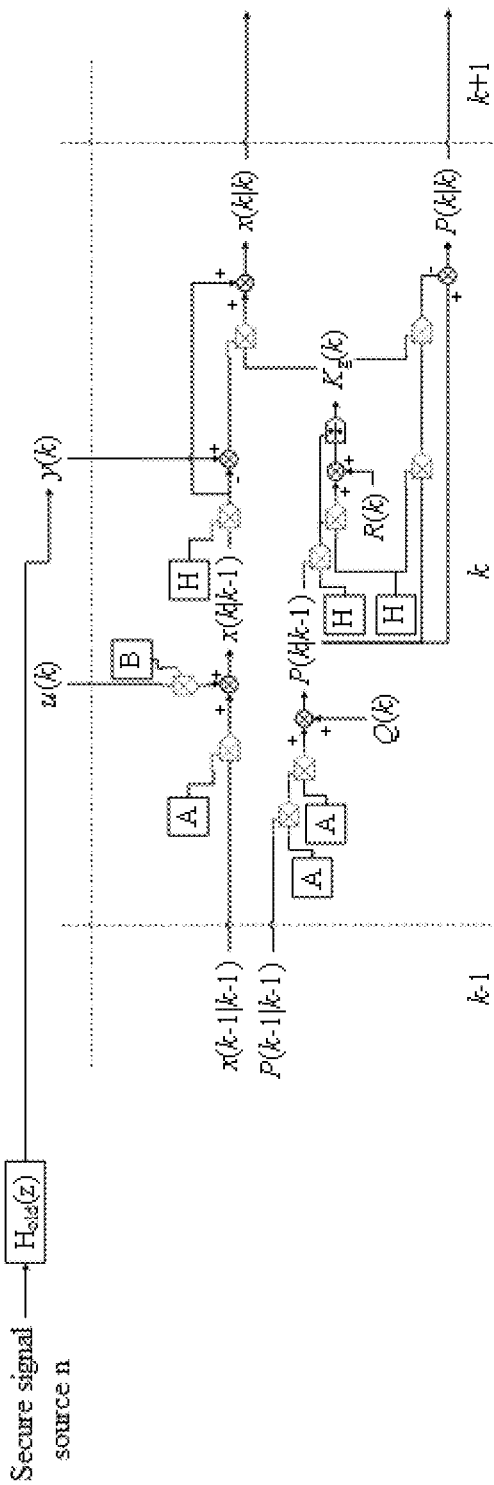
FIG. 4 is a schematic diagram showing a principle of a Kalman filtering method-based multi-source data fusion security algorithm for performing speed measurement and poisoning according to the present disclosure.

Specifically, Reference is made to FIG. 4, which is a schematic diagram showing a principle of a Kalman filtering method-based multi-source data fusion security algorithm for speed measurement and poisoning according to the present disclosure.

As shown in FIG. 4, x(k/k) indicates a speed or a position, and P(k/k) indicates reliability. That is, after data outputted from a signal source is processed by using this algorithm, an output corresponding to the current input and reliability of the output are outputted. An output with a high reliability has a great effect on a final output. With the Kalman filtering method-based multi-source data fusion security algorithm for speed measurement and poisoning, accurate data distribution is estimated optimally, thereby reducing the system noise and an external interference.

Figure 5:
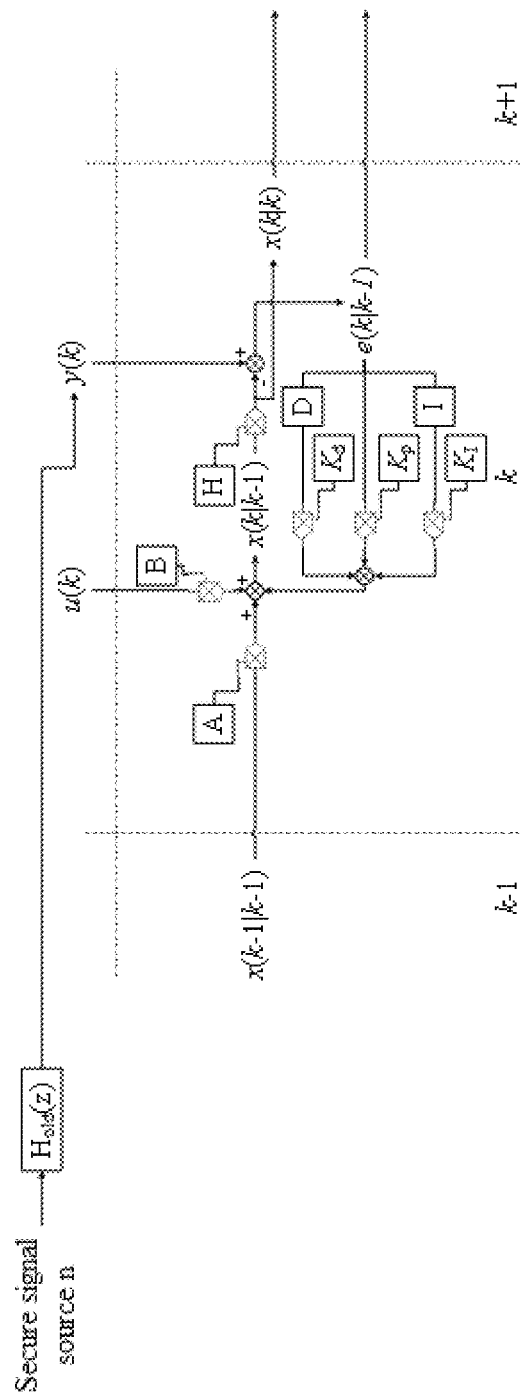
FIG. 5 is a schematic diagram showing a principle of an iteration correction method-based multi-source data fusion security algorithm for performing speed measurement and poisoning according to the present disclosure.

Reference is made to FIG. 5, which is a schematic diagram showing a principle of an iteration correction method-based multi-source data fusion security algorithm for speed measurement and poisoning according to the present disclosure.

As shown in FIG. 5, x(k/k) indicates a speed or a position, e(k/k) indicates an observation error. With the iteration correction method-based multi-source data fusion security algorithm for speed measurement and poisoning, a system estimation error is constantly corrected, thereby improving system accuracy and eliminating common-mode interference.

Other security algorithms may be used in the two-out-of-three selecting security structure, as long as the object of the present disclosure is achieved.

Preferably, the number of the inertial navigation signal source is four, and the number of the satellite signal source is four.

The number of the inertial navigation signal source and the number of the satellite signal source are not limited herein. The four inertial navigation signal sources may be of the same type or different types. Similarly, the four satellite signal sources may be of the same type or different types, which is not limited herein.

Preferably, the four satellite signal sources are respectively implemented by a BeiDou satellite chipset, a GPS satellite chipset, a GLONASS satellite chipset and a Galileo satellite chipset.

The four satellite signal sources may be respectively implemented by two BeiDou satellite chipsets, a GPS satellite chipset, and a GLONASS satellite chipset, or may be implemented by rearrangements of the four satellite signal sources in the above preferred embodiment, which is not limited herein.

Figure 6:
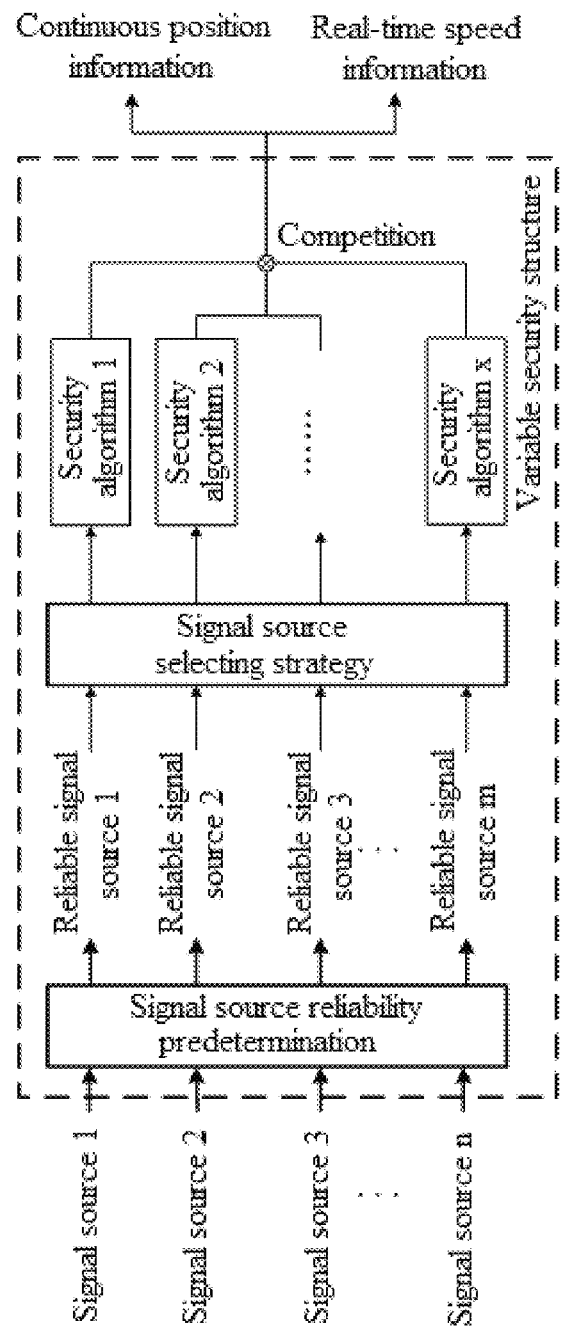
FIG. 6 is a schematic block diagram showing a principle for safely and reliably performing real-time speed measurement and continuous positioning according to the present disclosure.

In order to describe the method for safely and reliably performing real-time speed measurement and continuous positioning according to the present disclosure, reference is made to FIG. 6, which is a schematic block diagram showing a principle for safely and reliably performing real-time speed measurement and continuous positioning according to the present disclosure.

In practice, in order to improve the accuracy, security and reliability in speed measurement and positioning for the train, reliability of data from signal sources may be predetermined after the data is obtained, to select reliable signal sources. Then a combination of signal sources is determined according to a signal source selecting strategy, and the data from the reliable signal sources is processed by using the security algorithm. Speeds and positions obtained by using the security algorithms are processed through a compete process to obtain final the speed and position.

In addition, the "secure and reliable" in the present disclosure indicates that, in a case that some of the signal sources are lost, speed information and position information may be outputted safely and reliably with the method for performing real-time speed measurement and continuous positioning, and the speed information and the position information are identified and used by only an authorized device. In a case that the lost signal sources are recovered, these signal sources may perform normal speed measurement and positioning seamlessly. Theoretically, as long as at least one signal source is active, the system may operate normally, where an operation level is determined based on a security requirement.

Figure 7:
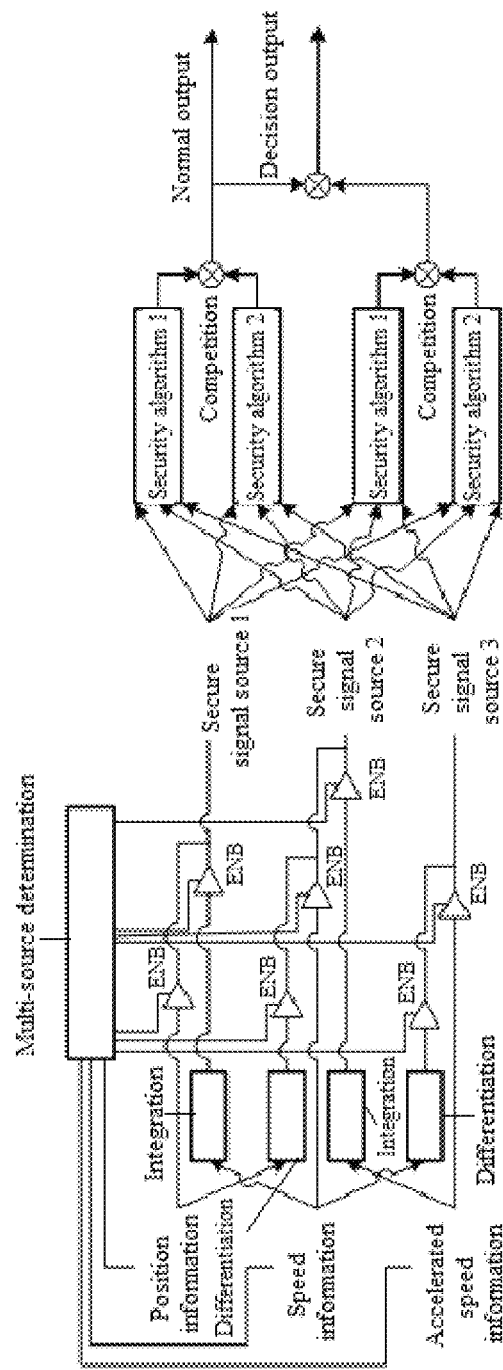
FIG. 7 is a schematic diagram of a multi-source double two-vote-two security structure based on position information, speed information and accelerated speed information according to the present disclosure.

For the above security structure, reference is made to FIG. 7, which is a schematic diagram of a multi-source double two-vote-two security structure based on position information, speed information and accelerated speed information according to the present disclosure.

The multi-source double two-vote-two security structure is formed based on the position information, the speed information and the accelerated speed information. With this security structure, a requirement for safely and reliably performing real-time speed measurement and continuous positioning is met even in a case that some of the signal sources are missed.

It is to be noted that the position and the speed are obtained from either a satellite system or the inertial navigation system, and the accelerated speed is typically obtained from the inertial navigation system.

Figure 8:
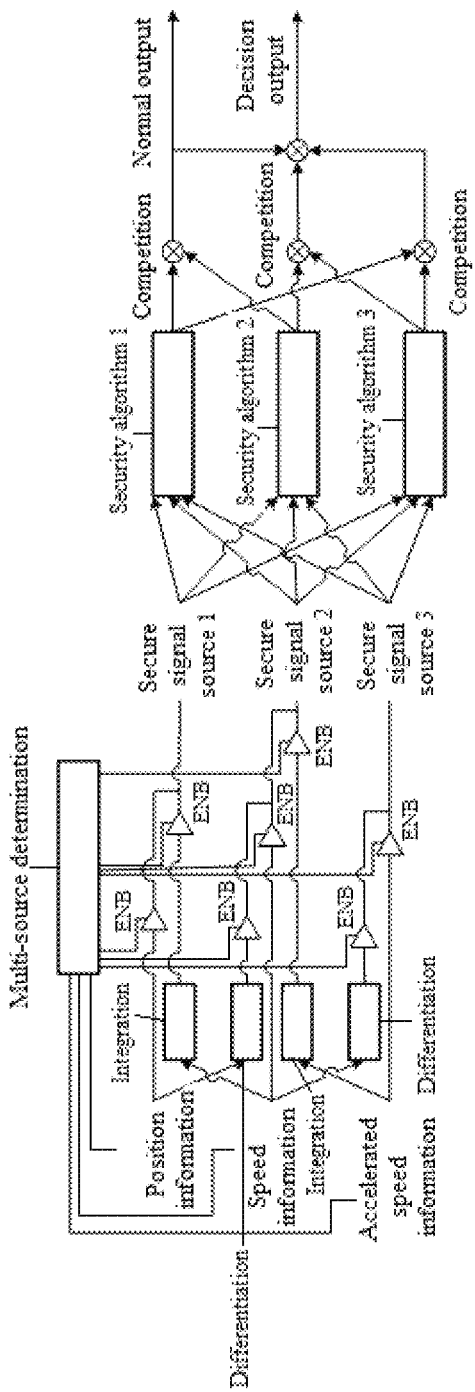
FIG. 8 is a schematic diagram of a multi-source two-out-of-three selecting security structure based on position information, speed information and accelerated speed information according to the present disclosure.

Reference is made to FIG. 8, which is a schematic diagram of a multi-source two-out-of-three selecting security structure based on position information, speed information and accelerated speed information according to the present disclosure.

The multi-source two-out-of-three selecting security structure is formed based on the position information, the speed information and the accelerated speed information. With this security structure, the requirement for safely and reliably performing real-time speed measurement and continuous positioning is met even in a case that any two of the signal sources are lost.

Figure 9:
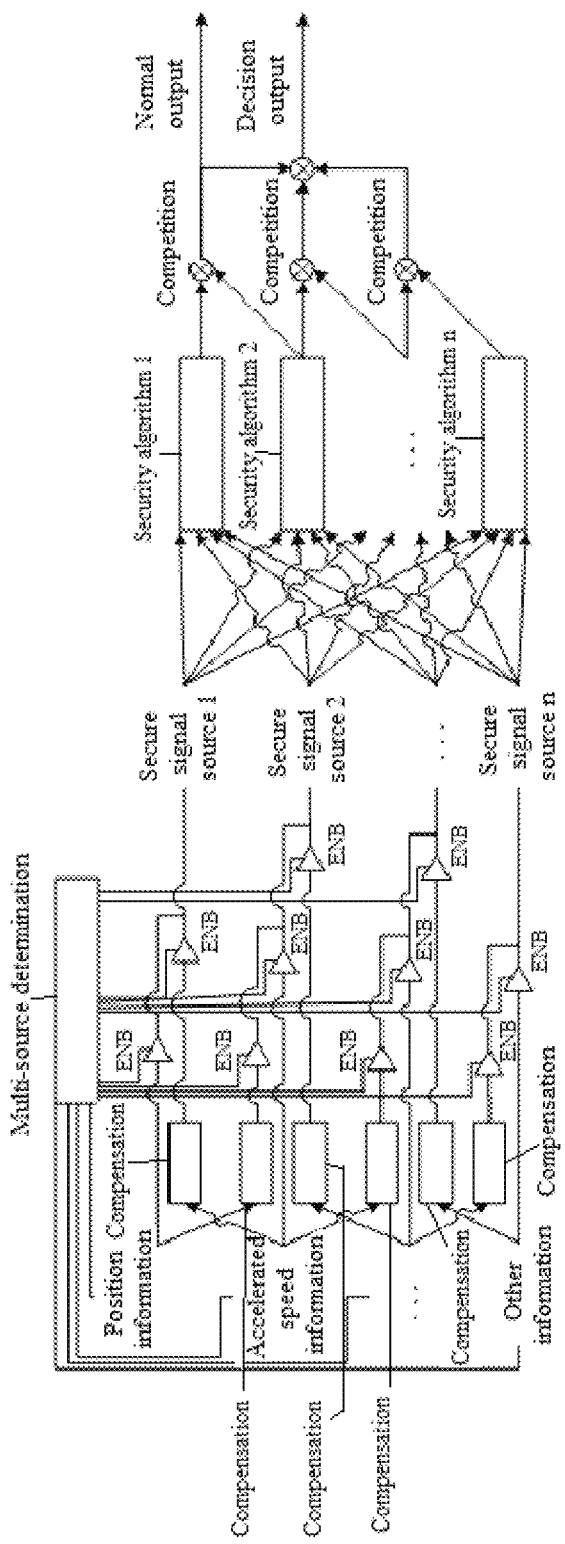
FIG. 9 is a schematic diagram of a multi-source two-out-of-multiple selecting security structure based on position information, speed information and accelerated speed information according to the present disclosure.

Reference is made to FIG. 9, which is a schematic diagram of a multi-source two-out-of-multiple selecting security structure based on position information, speed information and accelerated speed information according to the present disclosure.

The multi-source two-out-of-multiple selecting security structure is formed based on the position information, the accelerated speed information and the like. With this security structure, the requirement for safely and reliably performing real-time speed measurement and continuous positioning is met even in a case that there is only one signal source.

Figure 10:
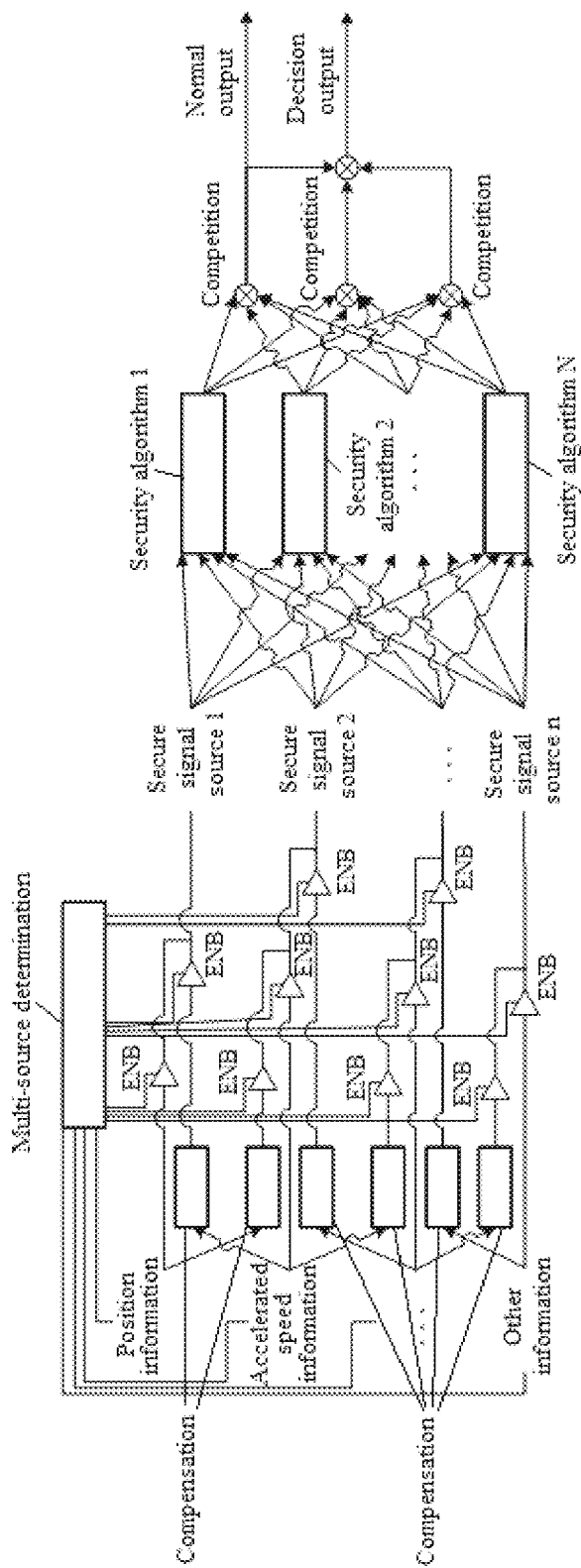
FIG. 10 is a schematic diagram of a multi-source multi-selecting security structure based on position information, speed information and accelerated speed information according to the present disclosure.

Reference is made to FIG. 10, which is a schematic diagram of a multi-source multi-selecting security structure based on position information, speed information and accelerated speed information according to the present disclosure.

The multi-source multi-selecting security structure is formed based on the position information, the accelerated speed information and the like. With this security structure, the requirement for safely and reliably performing real-time speed measurement and continuous positioning is met even in a case that there is only one signal source for speed measurement or positioning.

Figure 11:
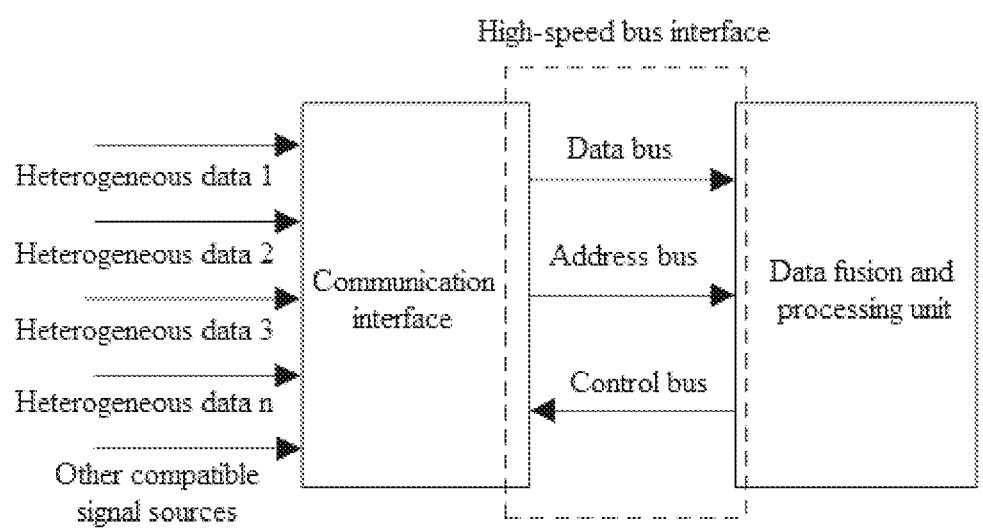
FIG. 11 is a schematic structural diagram of a data fusion and processing unit supporting rapid expansion according to the present disclosure.

Reference is made to FIG. 11, which is a schematic structural diagram of a data fusion and processing unit supporting rapid expansion according to the present disclosure.

Multi-source data is processed through a conversion operation in, for example, electric level and communication protocol, via a communication interface, to obtain heterogeneous isomorphic data with the same format and scale, and the heterogeneous isomorphic data is transmitted to a fusion processor via a high-speed bus for a data fusion process on multi-source data. The data fusion and processing unit may be implemented as a code fragment in a fusion processor.

Figure 12:
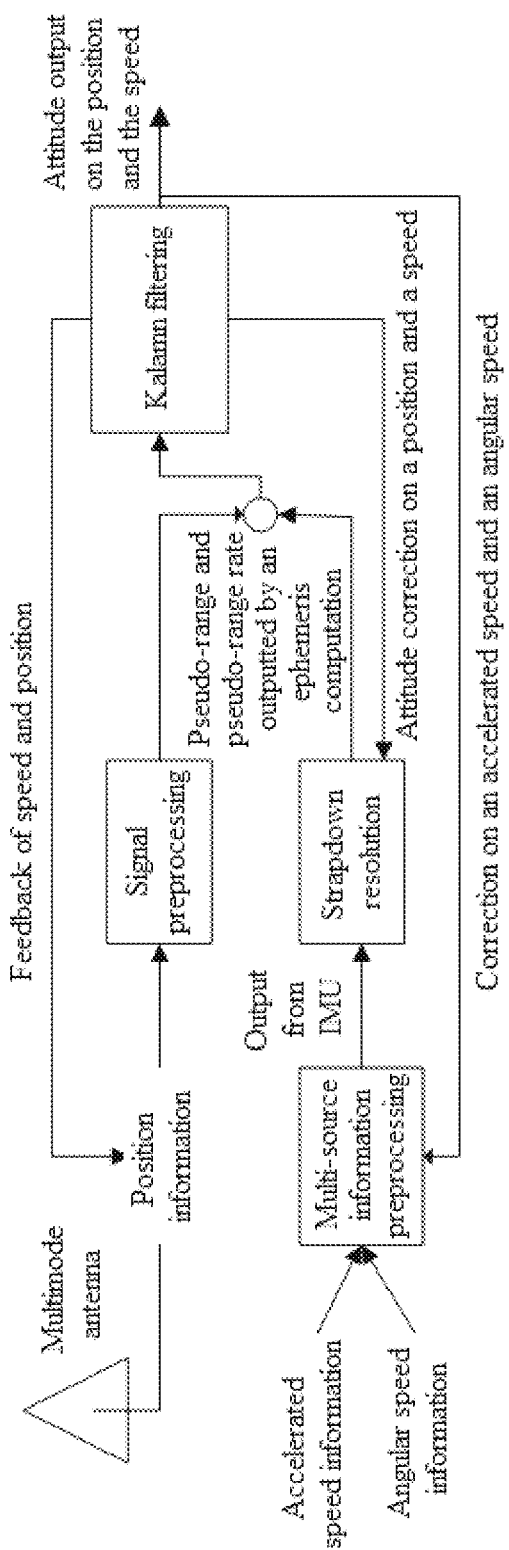
FIG. 12 is a schematic diagram showing a principle of a tightly-coupled multi-source information integration manner based on an inertial navigation signal source according to the present disclosure.

Reference is made to FIG. 12, which is a schematic diagram showing a principle of a tightly-coupled multi-source information integration manner based on an inertial navigation signal source according to the present disclosure.

Figure 13:
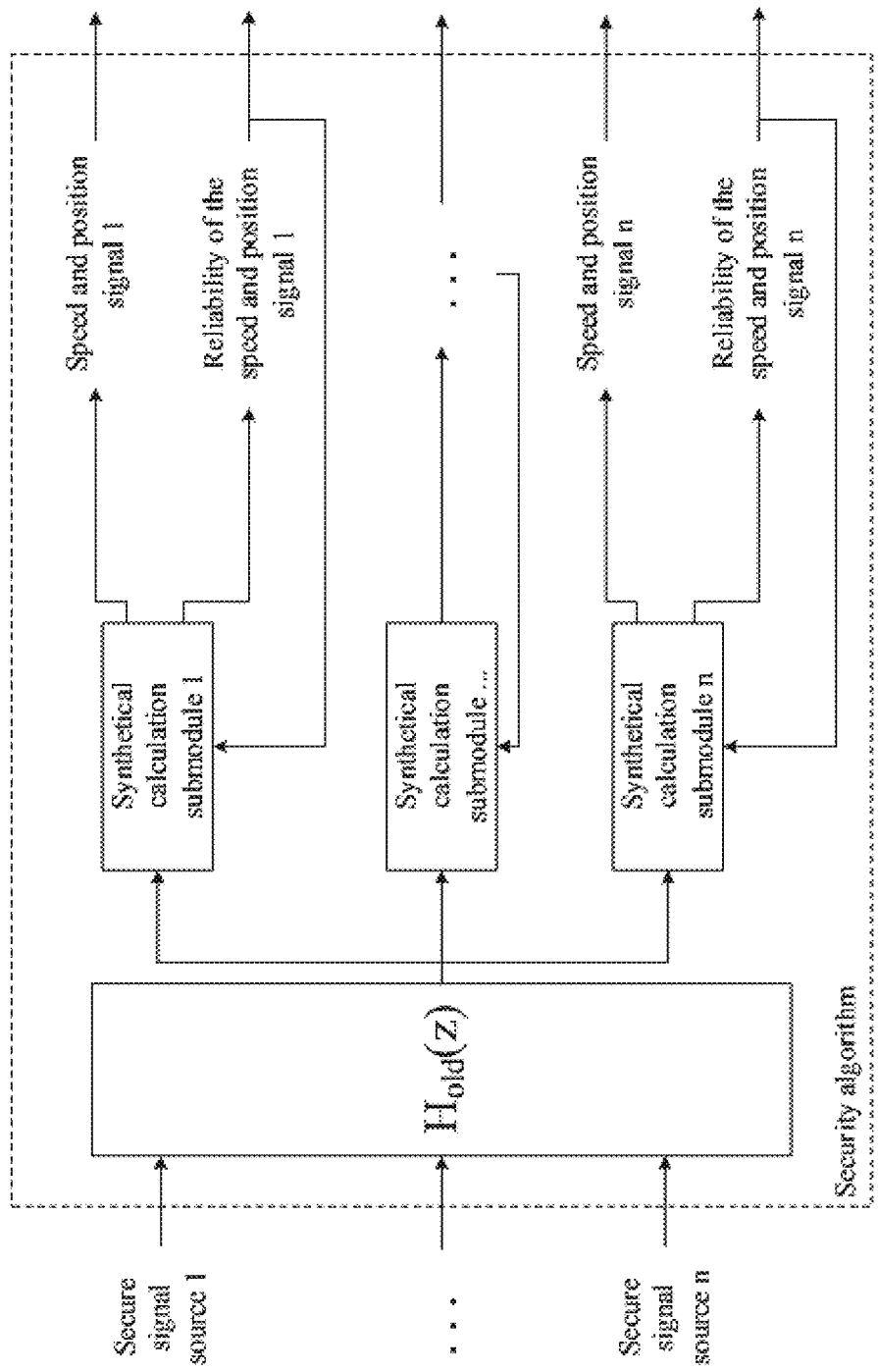
FIG. 13 is a schematic diagram showing a framework of a security algorithm according to the present disclosure.

Reference is made to FIG. 13, which is a schematic diagram showing a framework of a security algorithm according to the present disclosure.

The security algorithm is configured to perform selection and synthetic operation on data from a signal source for speed measurement and a signal source for continuous positioning in a security structure according to an appropriate security rule. A mathematical method involved in the security algorithm may include but not limited to Kalman filtering method, an iteration correction method, a pseudo-range and a pseudo-range rate estimator.

In addition, a fast integer ambiguity resolution is performed by using original data from a multi-source satellite and the inertial navigation system with an advanced algorithm, and an ill-conditioned equation is corrected with an algorithm, such that accuracy of the integer ambiguity is improved, thereby further improving speed of resolving the equation, thus achieving real-time output.

Figure 14:
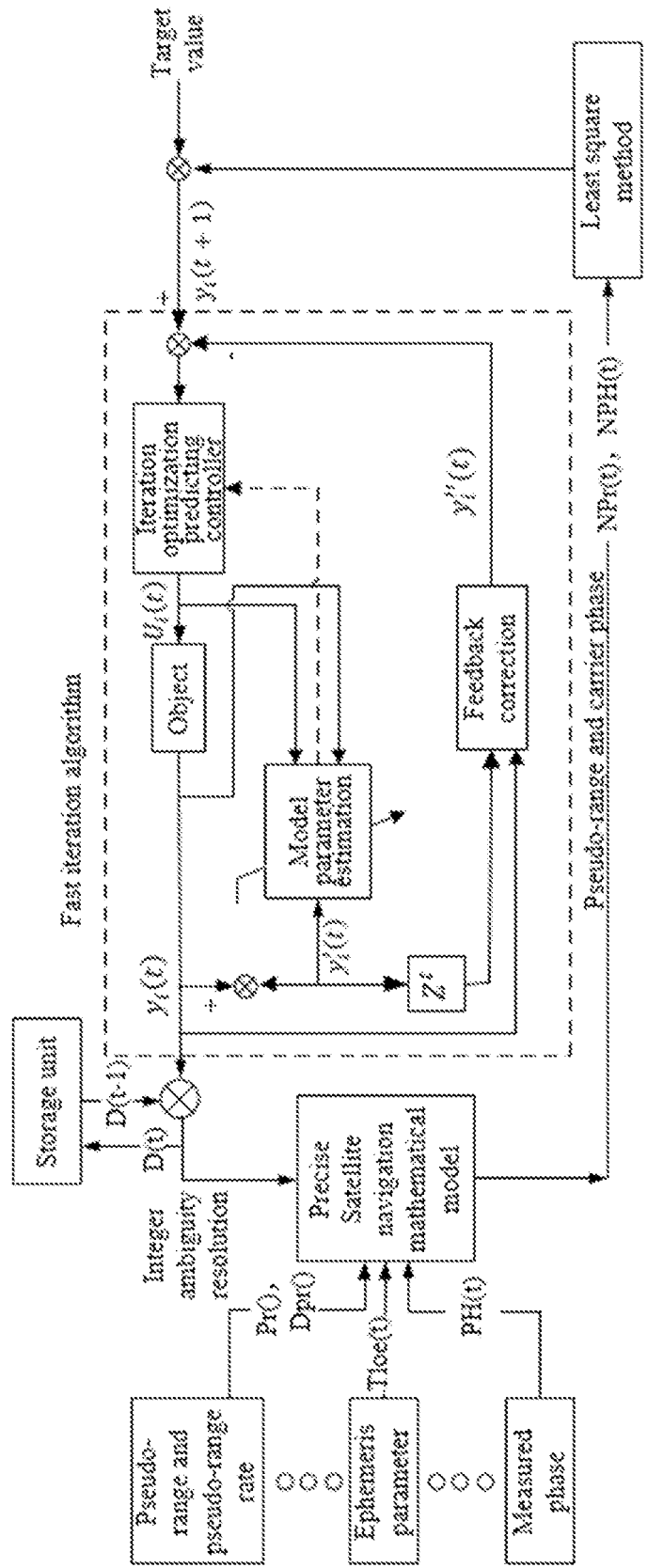
FIG. 14 is a schematic diagram showing a principle of an integer ambiguity algorithm based on a fast iteration convergence least square method according to the present disclosure.

Reference is made to FIG. 14, which is a schematic diagram showing a principle of an integer ambiguity algorithm based on a fast iteration convergence least square method according to the present disclosure.

It is to be noted that D(t) indicates a speed or a position.

For the real-time speed measurement, a fast integer ambiguity resolution algorithm based on a fast iteration convergence least square search method is provided according to the present disclosure, with which the fast integer ambiguity resolution process is performed based on strong tracking of the fast iteration convergence least square search method.

Figure 15:
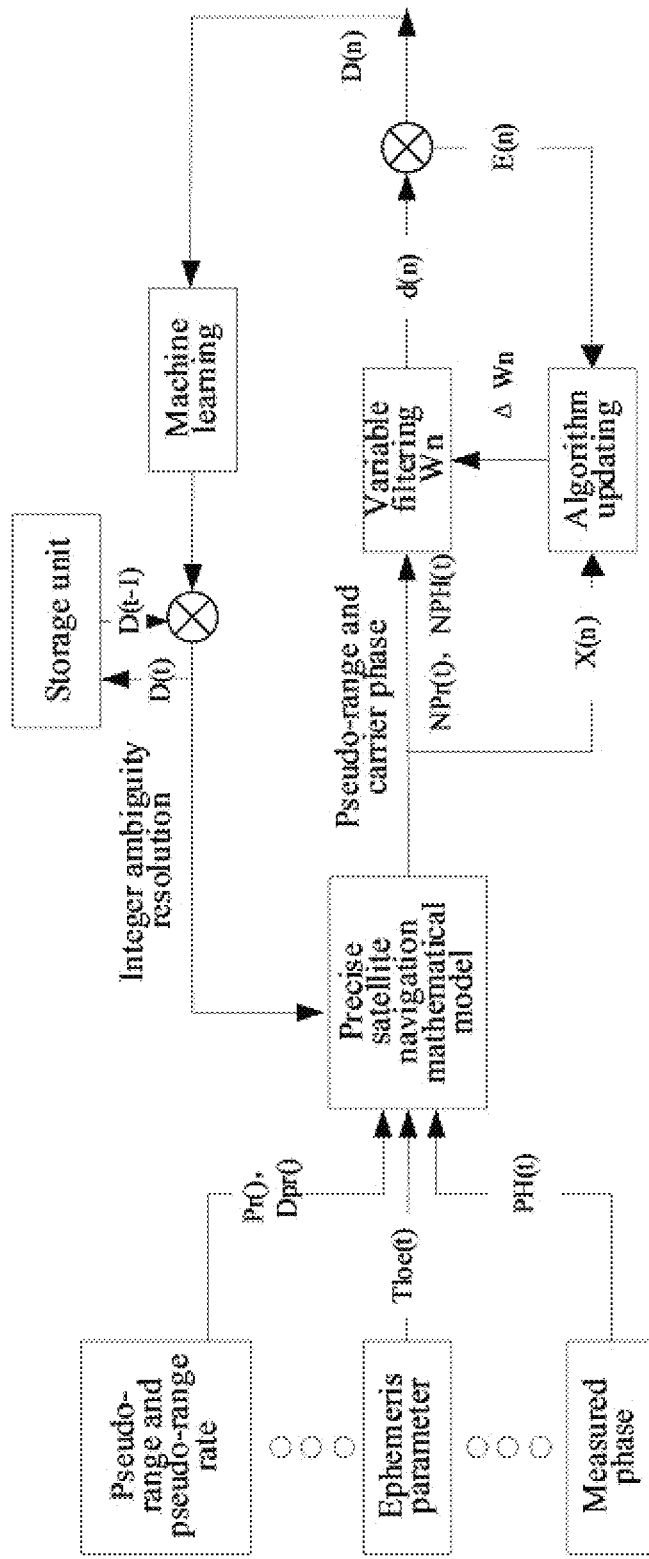
FIG. 15 is a schematic diagram showing a principle of an integer ambiguity algorithm based on a machine learning method according to the present disclosure.

Reference is made to FIG. 15, which is a schematic diagram showing a principle of an integer ambiguity algorithm based on a machine learning method according to the present disclosure.

It is to be noted that D(t) indicates a speed or a position.

For the real-time speed measurement, a fast integer ambiguity resolution algorithm is provided, which includes an optimizing fuzzy resolution algorithm based on a machine learning method. In this way, effect of unknown interference on the fast integer ambiguity resolution algorithm can be eliminated due to the strong adaptive capability of the machine learning method.

Figure 16:
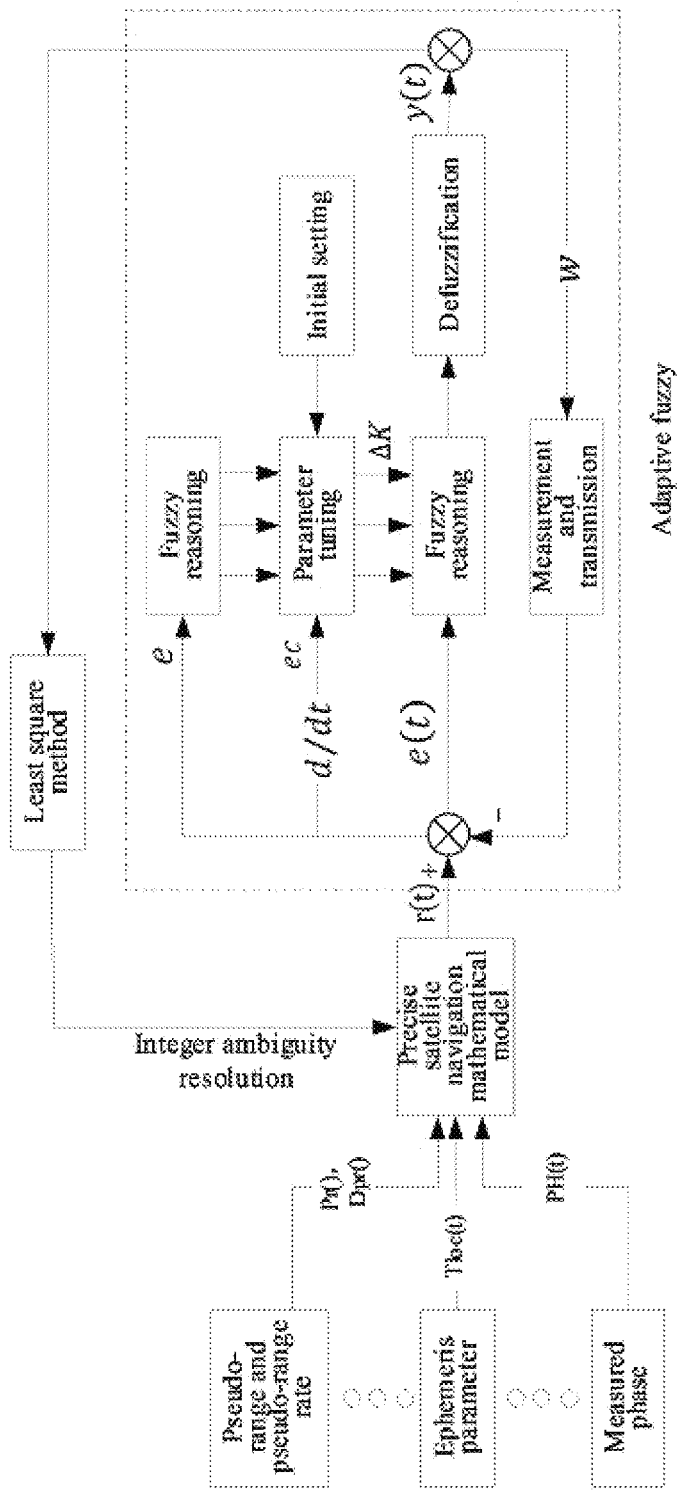
FIG. 16 is a schematic diagram showing a principle of an integer ambiguity algorithm based on an adaptive ambiguity method according to the present disclosure.

Reference is made to FIG. 16, which is a schematic diagram showing a principle of an integer ambiguity algorithm based on an adaptive ambiguity method according to the present disclosure.

For the real-time speed measurement, a fast integer ambiguity resolution algorithm is provided, which includes an adaptive ambiguity least square method.

Figure 17:
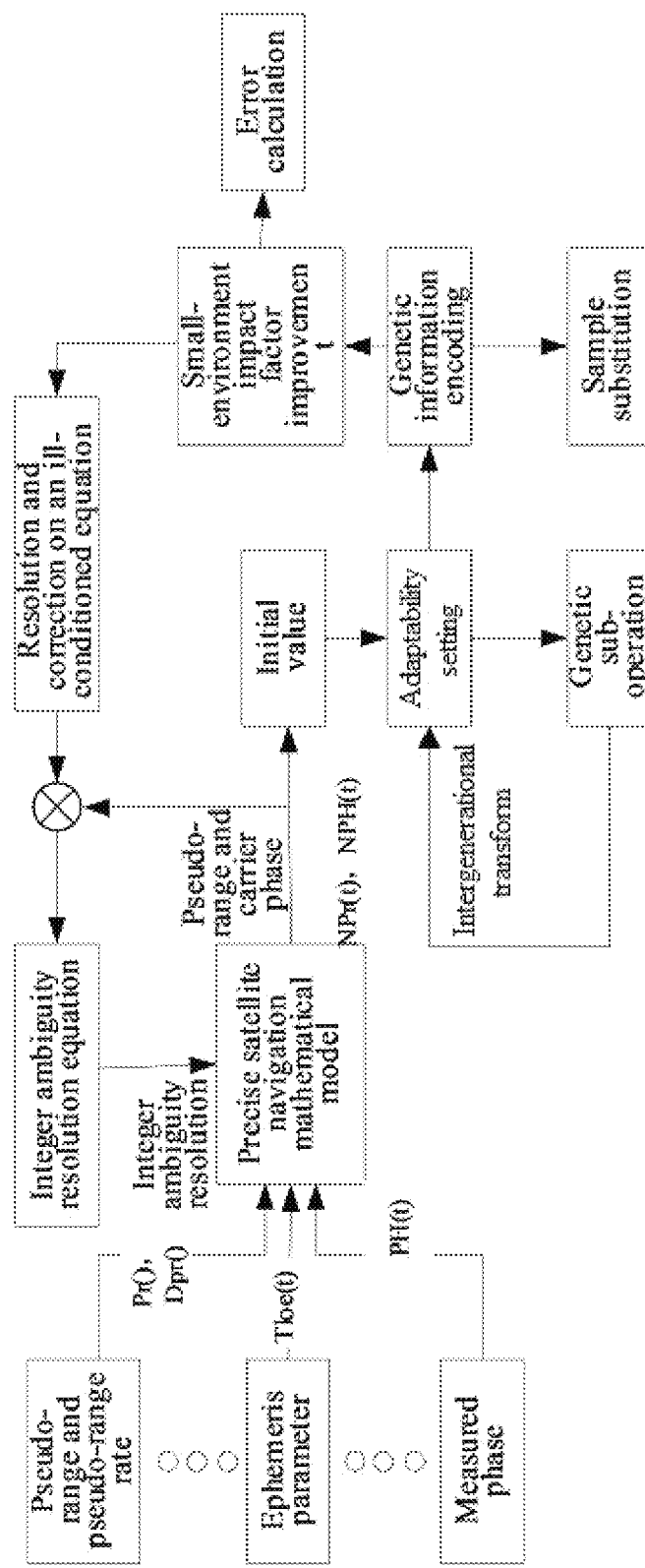
FIG. 17 is a schematic diagram showing a principle of a parameter estimation method based on an improved small-environment genetic algorithm according to the present disclosure.

Reference is made to FIG. 17, which is a schematic diagram showing a principle of a parameter estimation method based on an improved small-environment genetic algorithm according to the present disclosure.

For the real-time speed measurement, a fast integer ambiguity resolution algorithm is provided, which includes a parameter estimation method based on the improved small-environment genetic algorithm for a rapid positioning ill-conditioned equation. With the fast integer ambiguity resolution algorithm, parameters for the positioning ill-conditioned equation are estimated reliably due to the global searching capability of the improved small-environment genetic algorithm.

Figure 18:
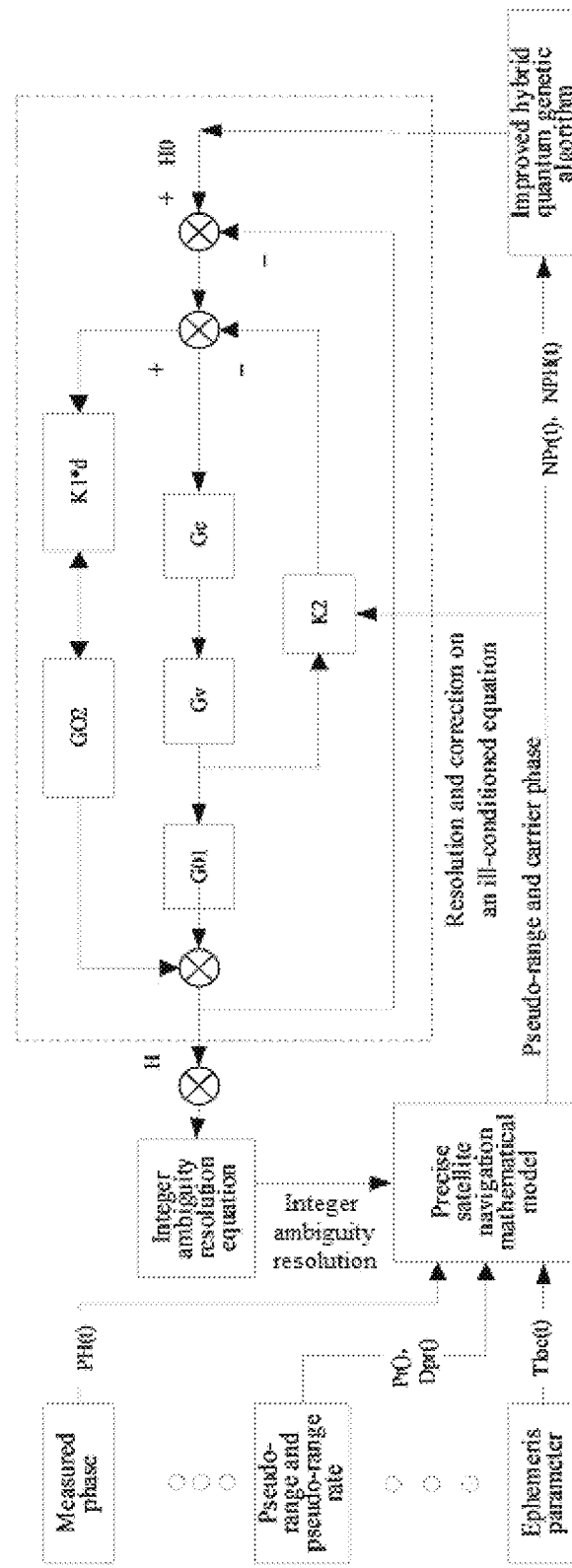
FIG. 18 is a schematic diagram showing a principle of a parameter estimation method based on an improved hybrid quantum genetic algorithm according to the present disclosure.

Reference is made to FIG. 18, which is a schematic diagram showing a principle of a parameter estimation method based on an improved hybrid quantum genetic algorithm according to the present disclosure.

A parameter estimation method based on the improved hybrid quantum genetic algorithm for a rapid positioning ill-conditioned equation is provided. With the parameter estimation method, parameters are estimated reliably due to advantages of the quantum genetic algorithm in searching range and population number.

Figure 19:
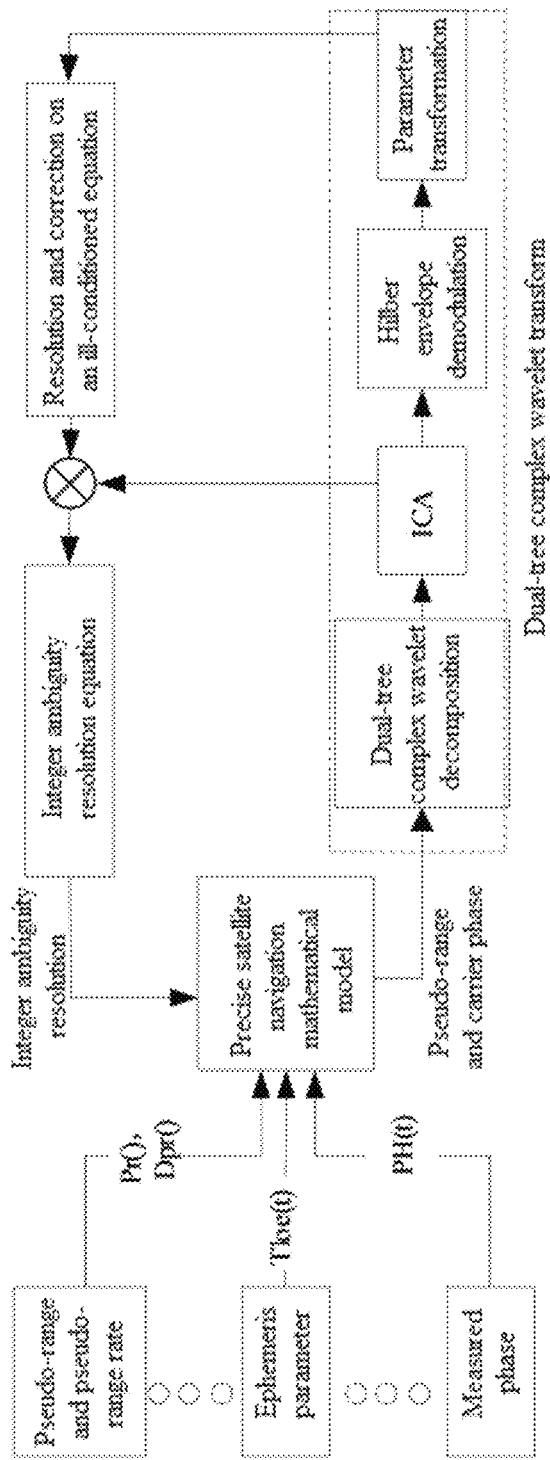
FIG. 19 is a schematic diagram showing a principle of a parameter estimation method based on dual-tree complex wavelet transform algorithm according to the present disclosure.

Reference is made to FIG. 19, which is a schematic diagram showing a principle of a parameter estimation method based on dual-tree complex wavelet transform algorithm according to the present disclosure.

A parameter estimation method for a positioning ill-conditioned equation based on the dual-tree complex wavelet transform algorithm is provided.

Figure 20:
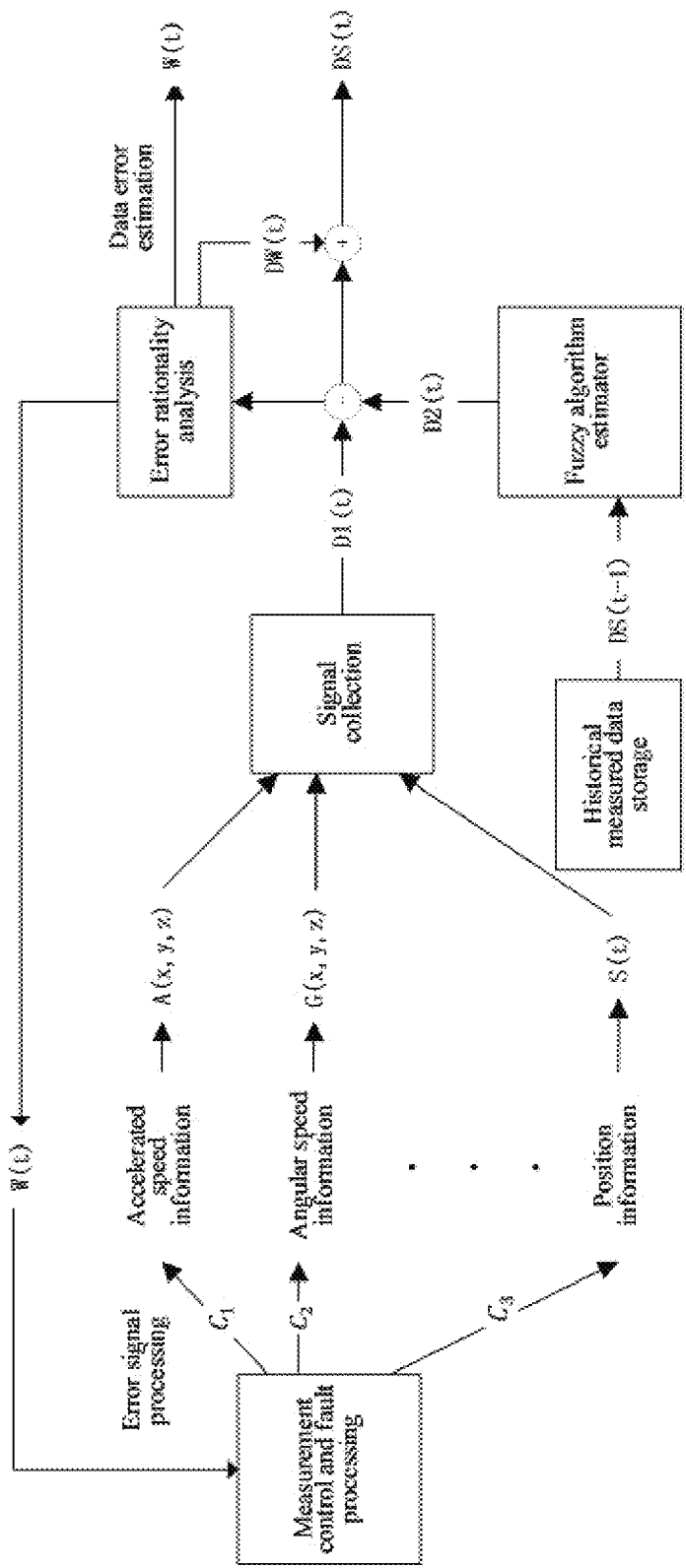
FIG. 20 is a schematic diagram showing a principle of a data monitoring and error analysis method based on a fuzzy algorithm according to the present disclosure.

Reference is made to FIG. 20, which is a schematic diagram showing a principle of a data monitoring and error analysis method based on fuzzy algorithm according to the present disclosure.

For the continuous positioning, an algorithm for predicting a real-time position of a train between two positioning points based on a neural network model is provided.

Figure 21:
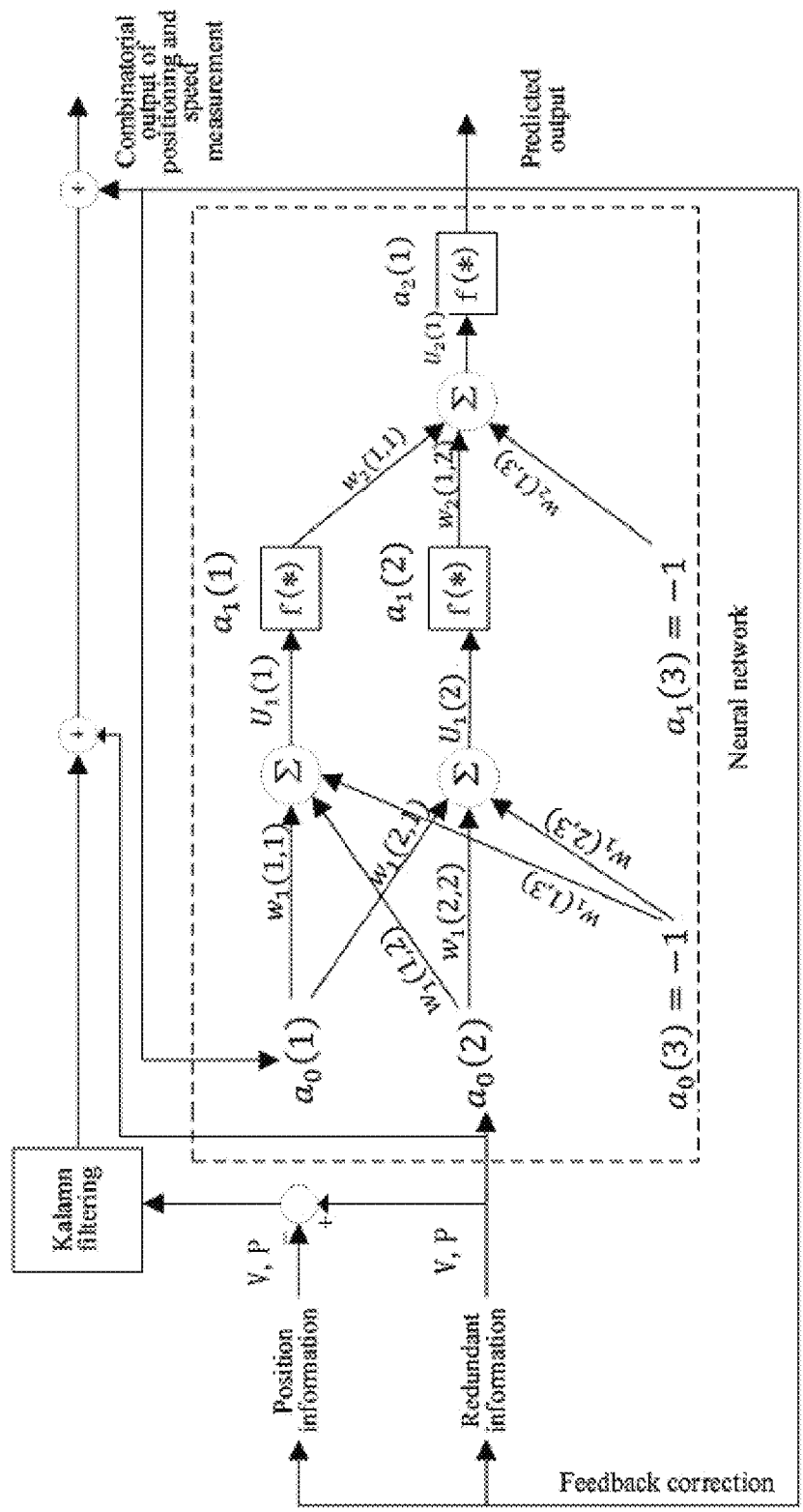
FIG. 21 is a schematic diagram showing a principle of a real-time prediction algorithm based on a neural network model according to the present disclosure.

Reference is made to FIG. 21, which is a schematic diagram showing a principle of a real-time prediction algorithm based on a neural network model according to the present disclosure.

For the continuous positioning, a real-time position information fusion algorithm based on improved Kalman filtering method is provided.

Figure 22:
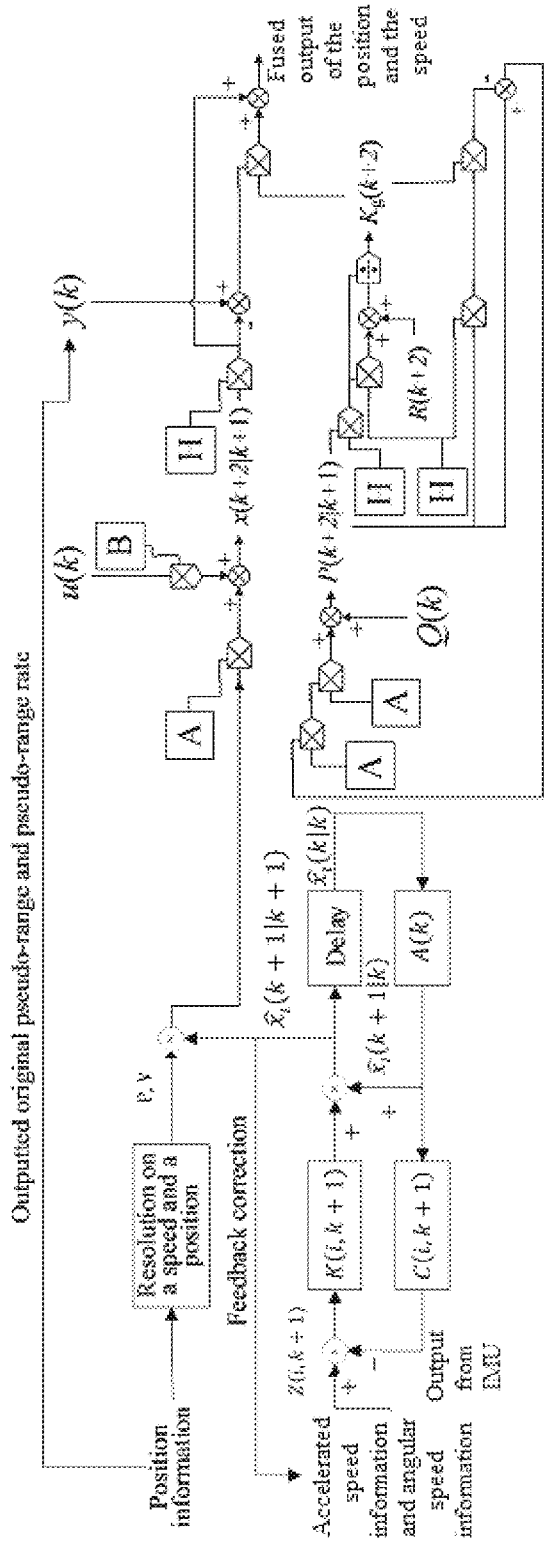
FIG. 22 is a schematic diagram showing a principle of a real-time position information fusion algorithm based on an improved Kalman filtering method according to the present disclosure.

Reference is made to FIG. 22, which is a schematic diagram showing a principle of a real-time position information fusion algorithm based on an improved Kalman filtering method according to the present disclosure.

For the continuous positioning, a real-time position information fusion algorithm based on a particle filtering algorithm is provided.

Figure 23:
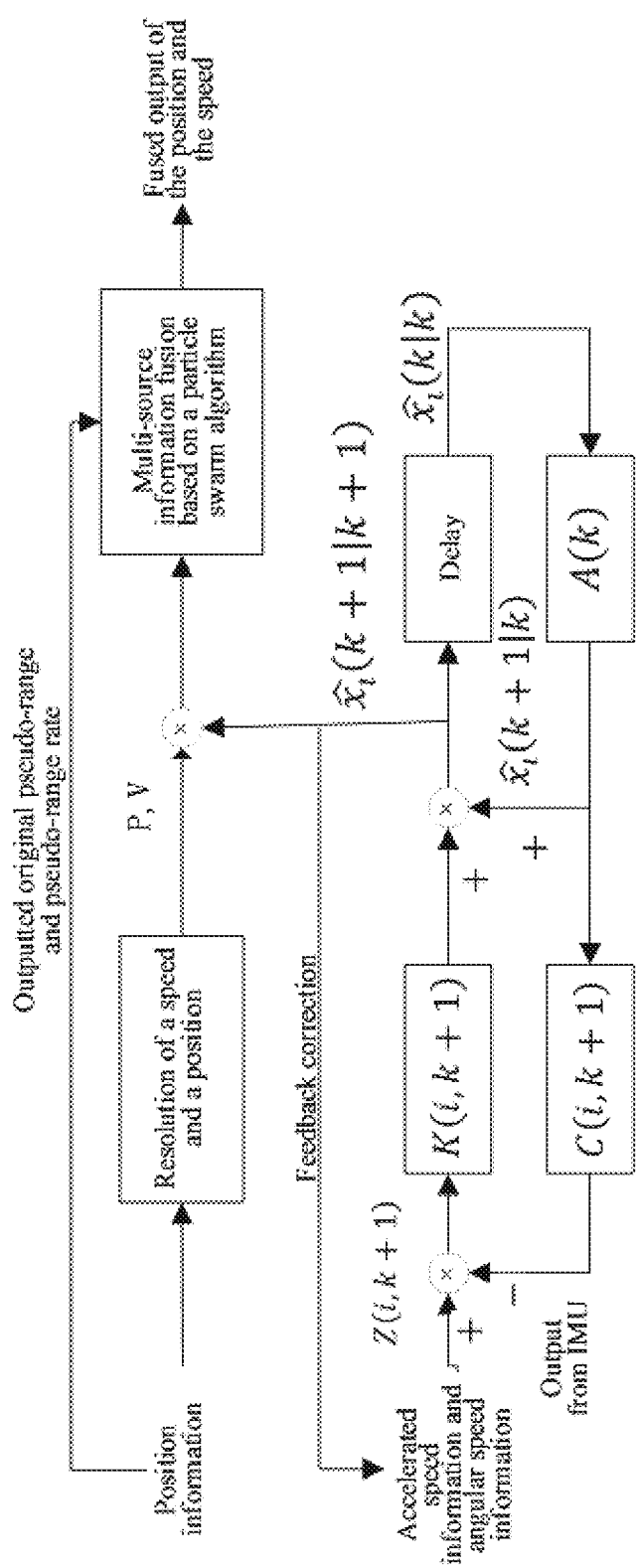
FIG. 23 is a schematic diagram showing a principle of a fusion algorithm based on a particle filtering method according to the present disclosure.

Reference is made to FIG. 23, which is a schematic diagram showing a principle of a fusion algorithm based on a particle filtering method according to the present disclosure.

For the continuous positioning, a fusion quaternion positioning resolution method based on a Rodrigues parameter method is provided.

Figure 24:
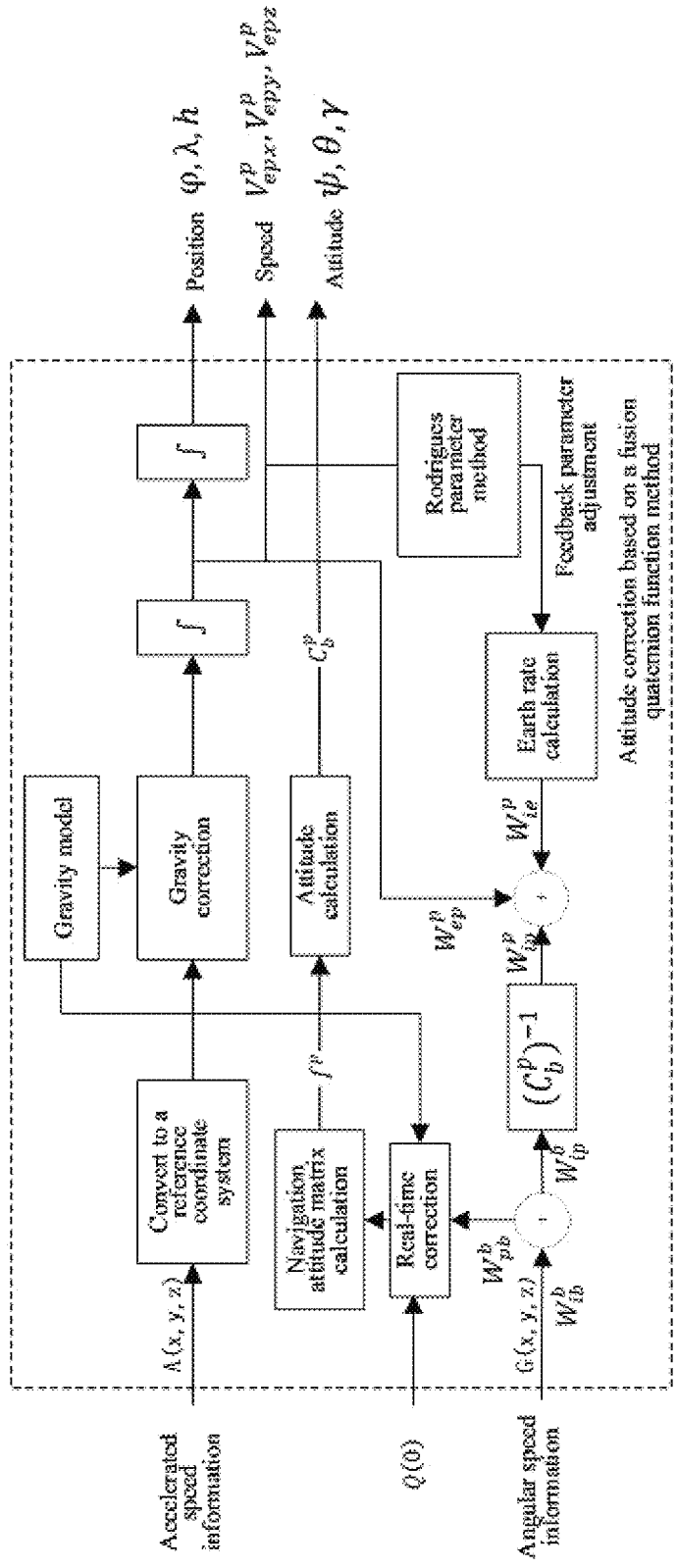
FIG. 24 is a schematic diagram showing a principle of a fusion quaternion positioning resolution algorithm based on a Rodrigues parameter method according to the present disclosure.

Reference is made to FIG. 24, which is a schematic diagram showing a principle of a fusion quaternion positioning resolution algorithm based on a Rodrigues parameter method according to the present disclosure.

For the real-time speed measurement, an improved speed information processing security structure is provided.

Figure 25:
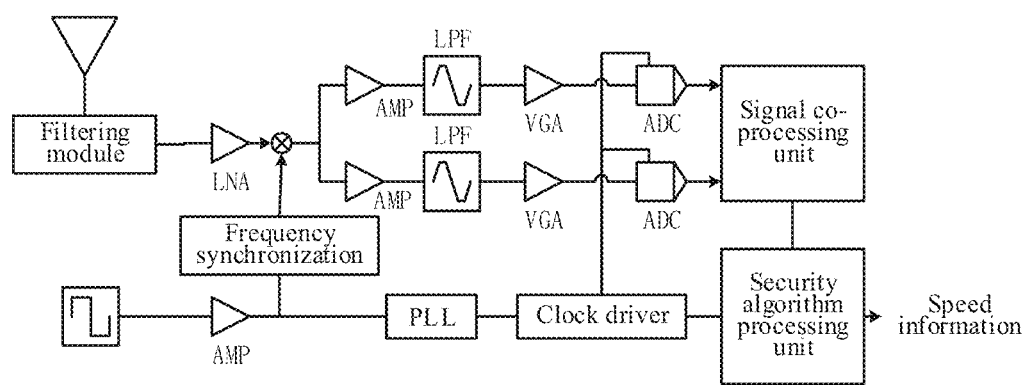
FIG. 25 is a schematic diagram showing an improved speed information processing security structure according to the present disclosure.

Reference is made to FIG. 25, which is a schematic diagram showing an improved speed information processing security structure according to the present disclosure.

This security structure includes two processing units. A signal co-processing unit is configured for radio-frequency amplification and baseband processing. A security algorithm processing unit is configured to perform resolution on the speed information.

Figure 26:
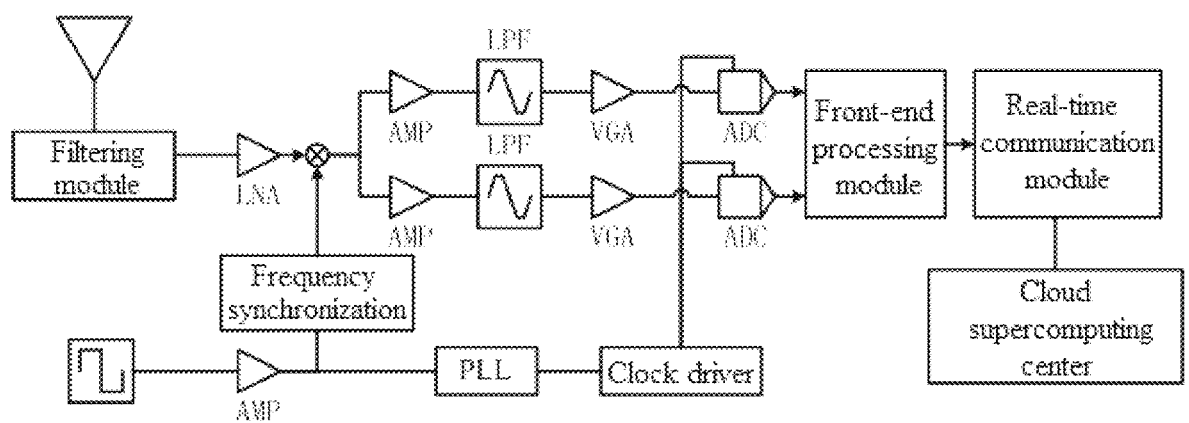
FIG. 26 is a schematic diagram showing another improved speed information processing security structure according to the present disclosure.

For the real-time speed measurement, an improved speed information cloud processing security structure is provided. Reference is made to FIG. 26, which is a schematic diagram showing another improved speed information processing security structure according to the present disclosure.

This security structure includes a dedicated front-end signal processing module and a real-time communication module. The real-time communication module is configured to transmit original position information to a cloud supercomputing center and receive a computing result from the cloud.

Figure 27:
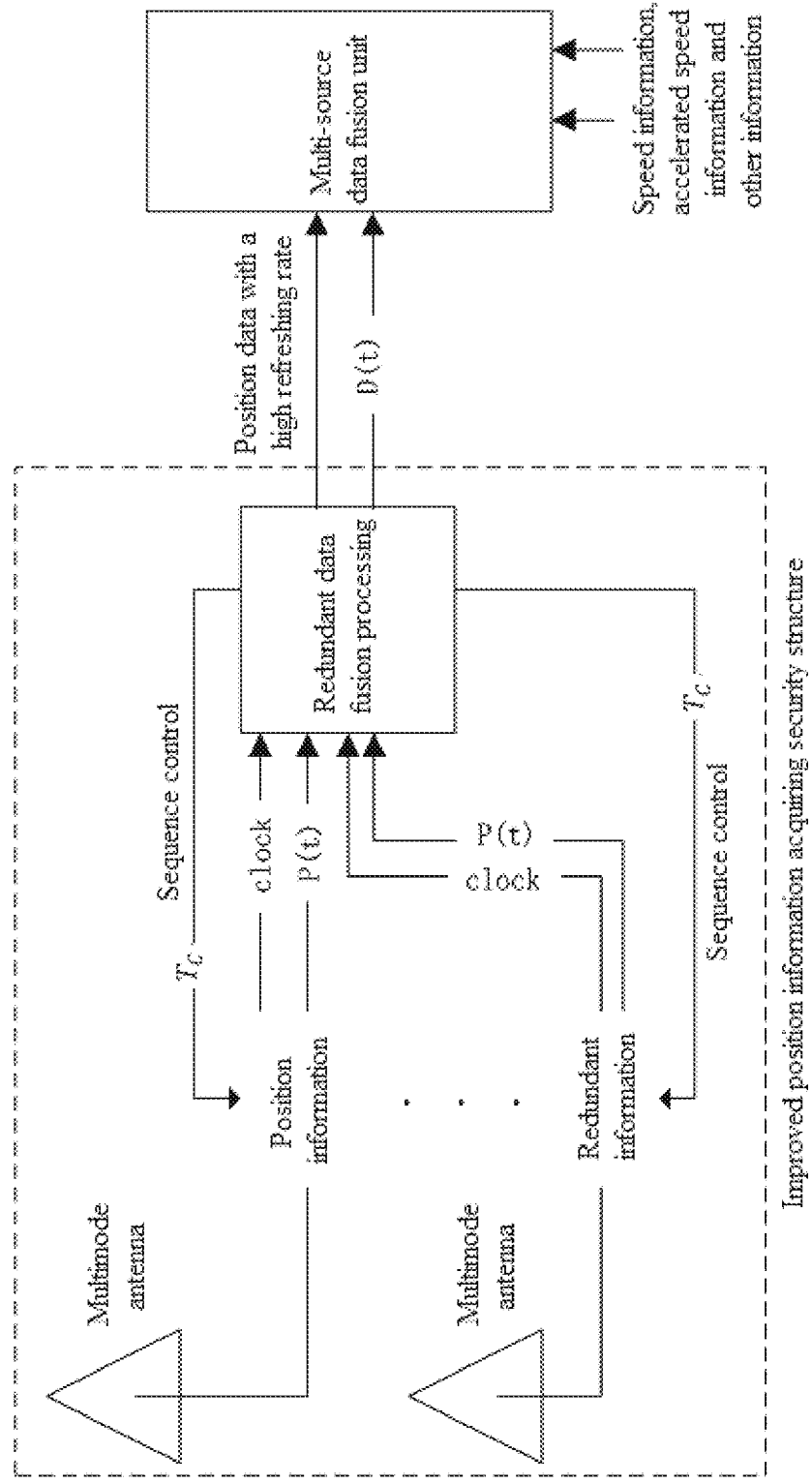
FIG. 27 is a schematic diagram showing an improved position information processing security structure according to the present disclosure.

For the continuous positioning, an improved position information processing security structure is provided. Reference is made to FIG. 27, which is a schematic diagram showing an improved position information processing security structure according to the present disclosure.

This security structure includes a redundant data fusion processing unit, a multi-source data fusion unit and matching software and hardware. The redundant data fusion processing unit is configured to process redundant position information to obtain position information with a high refreshing rate from redundant data. The multi-source data fusion processing unit is configured to fuse data from other sources and correct the obtained position information.

Figure 28:
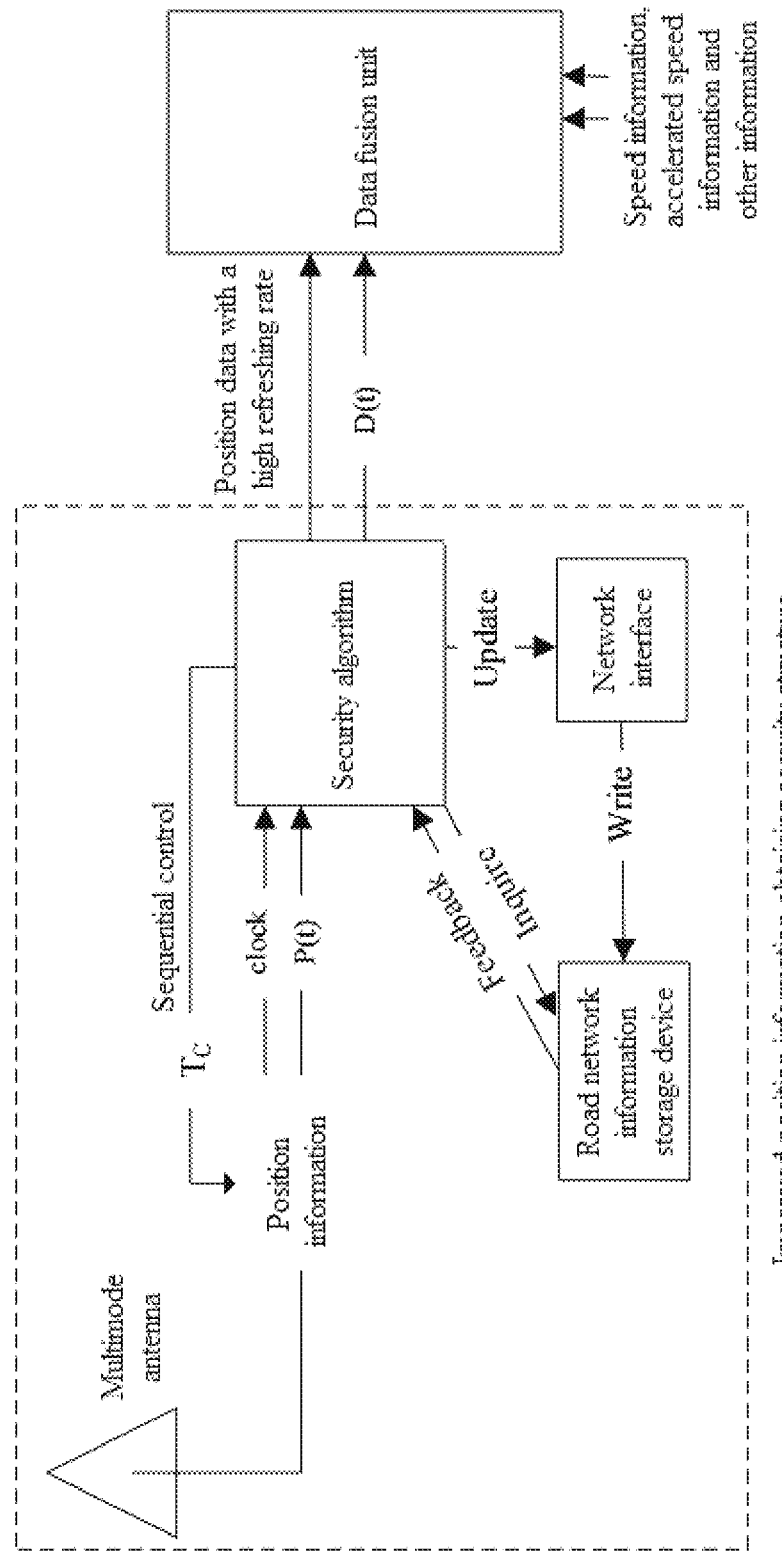
FIG. 28 is a schematic diagram showing another improved position information processing security structure according to the present disclosure.

For the continuous positioning, an improved position information cloud obtaining security structure is provided. Reference is made to FIG. 28, which is a schematic diagram showing another improved position information processing security structure according to the present disclosure.

This security structure includes a security algorithm module, a data fusion unit and a network storage device. The network storage device is configured to store road network information and scheduling information. The security algorithm module is configured to resolve the position information. The data fusion unit is configured to verify and correct the position information by using available information from other sources.

Figure 29:
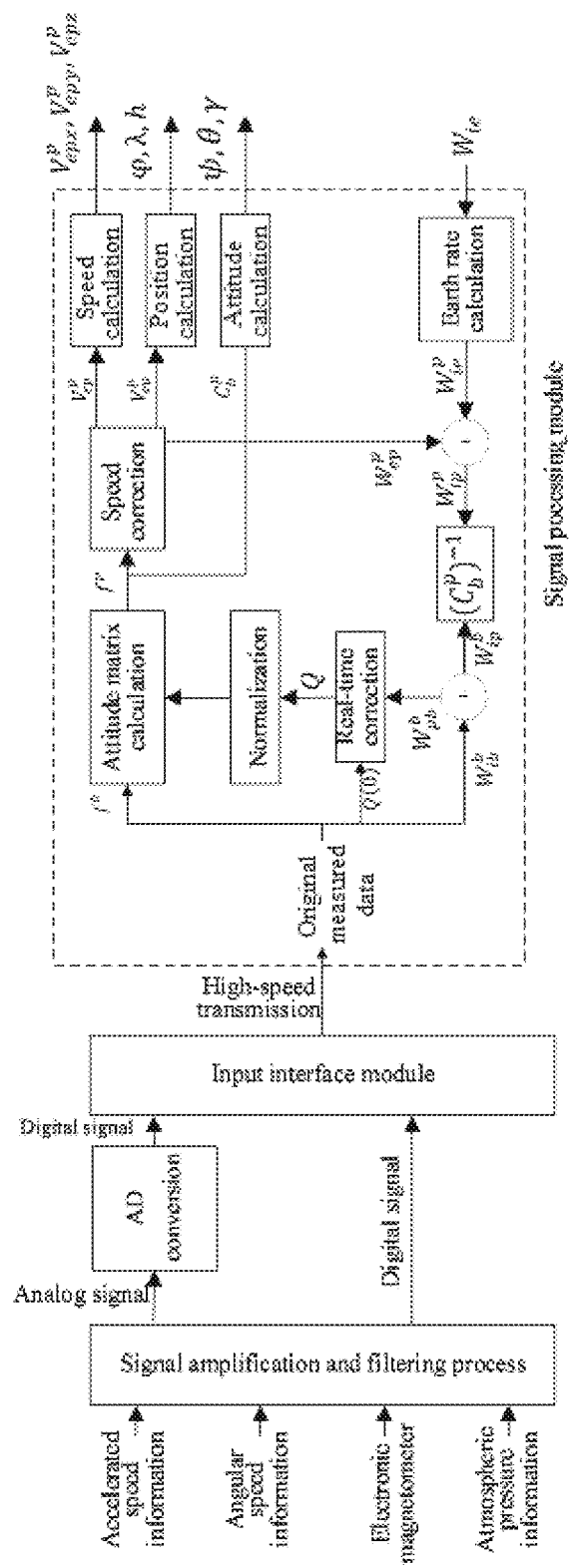
FIG. 29 is a schematic diagram showing an improved speed information and accelerated speed information processing structure according to the present disclosure.

For the continuous positioning, an improved angular speed information and accelerated speed information processing structure is provided. Reference is made to FIG. 29, which is a schematic diagram showing an improved speed information and accelerated speed information processing structure according to the present disclosure.

In this structure, information of the angular speed, the accelerated speed, electromagnetic force and atmospheric pressure and the like is considered. A sensor is configured to perform data measurement. An interface module is configured to read data. A signal processing module is configured for data processing and position resolution.

Figure 30:
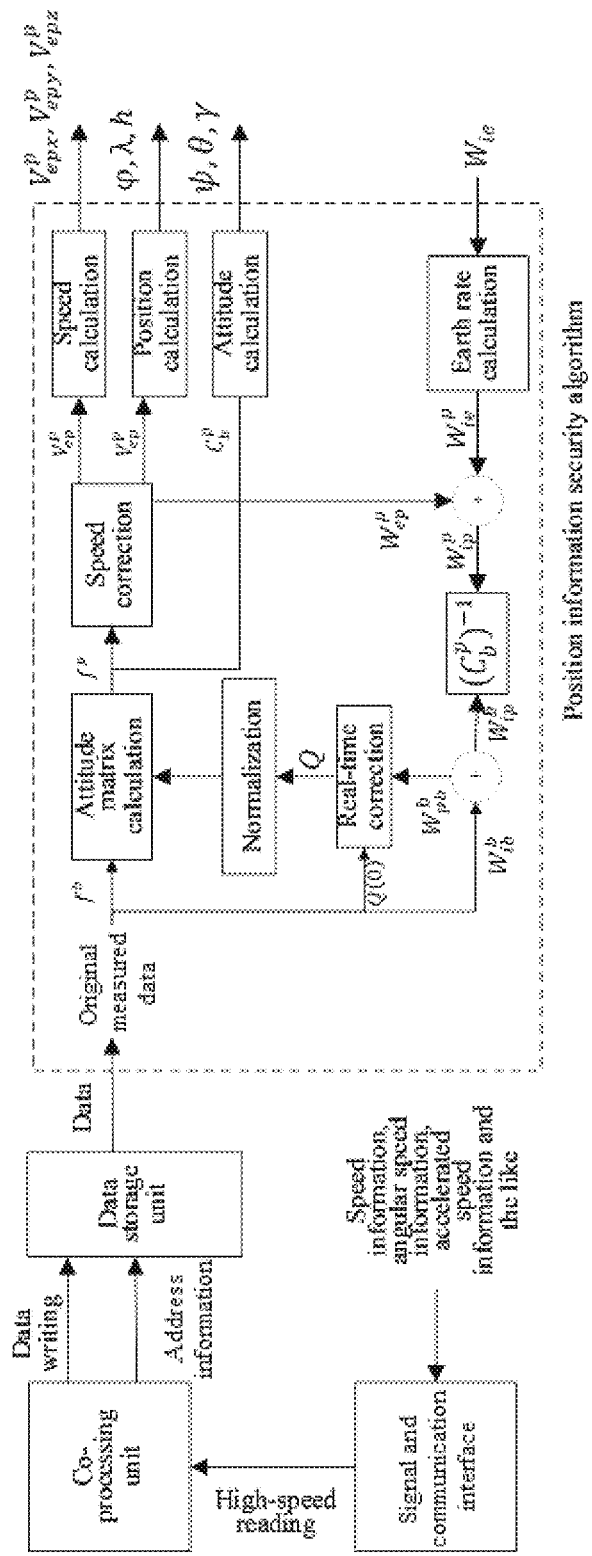
FIG. 30 is a schematic diagram showing an improved position information obtaining security structure based on a security algorithm according to the present disclosure.

For the continuous positioning, an improved position information obtaining security structure is provided. Reference is made to FIG. 30, which is a schematic diagram showing an improved position information obtaining security structure based on a security algorithm according to the present disclosure.

This structure includes a measuring sensor, a co-processing unit, a storage unit, and a position information security algorithm unit. The co-processing unit is configured to obtain multi-source information and write the multi-source information into the storage unit in real time. The position information security algorithm unit is configured to read data and resolve the position information in real time and in parallel.

Figure 31:
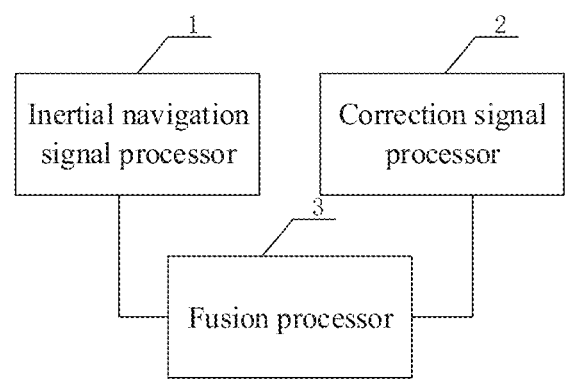
FIG. 31 is a schematic structural diagram showing a device for safely and reliably performing real-time speed measurement and continuous positioning according to the present disclosure.

Corresponding to the method described in the above embodiments, a device for safely and reliably performing real-time speed measurement and continuous positioning is further provided in the present disclosure. Reference is made to FIG. 31, which is a schematic structural diagram showing a device for safely and reliably performing real-time speed measurement and continuous positioning according to the present disclosure. The device includes an inertial navigation signal processor 1, a correction signal processor 2 and a fusion processor 3.

The inertial navigation signal processor 1 is configured to detect inertial navigation data from an inertial navigation signal source arranged in a train.

It is to be understood that it is required to arrange multiple independent signal sources for performing real-time speed measurement and continuous positioning in advance, each of which is implemented by a dedicated chip.

The inertial navigation signal processor 1 is arranged stably in a high-speed train strictly in a required axial direction. It is required to protect the inertial navigation signal processor 1 from dust and moisture. The inertial navigation signal processor 1 receives inertial navigation data from the inertial navigation signal source. The inertial navigation data includes accelerated speed information, angular speed information and the like. After receiving the inertial navigation data, the inertial navigation signal processor 1 may perform a primary reliability determination and execute a security fusion algorithm based on correction data obtained by the correction signal processor 2, to obtain several default outputs and decision outputs of speeds and positions, and transmit the default outputs and the decision outputs of the speeds and positions to the fusion processor 3.

The correction signal processor 2 is configured to detect correction data from a correction signal source. The correction signal source includes a satellite signal source arranged in the train. The correction data includes satellite data. The correction signal processor 2 includes a satellite signal processor.

The correction signal processor 2 is arranged in the high-speed train. The high-speed train is further provided with an antenna, which is configured to receive a satellite signal and perform the primary reliability determination and execute a security fusion algorithm on the received position information, speed information and time information, to obtain several default outputs and decision outputs of speeds and positions, and transmit the default outputs and the decision outputs of the speeds and positions to the fusion processor 3.

The fusion processor 3 is configured to: determine, in a case that no correction data is detected, a current speed and a current position of the train based on the inertial navigation data; and correct, in a case that the correction data is detected, the inertial navigation data by using the correction data and determine a current speed and a current position of the train based on the corrected inertial navigation data.

The fusion processor 3 is arranged in the high-speed train and is configured to receive data from the correction signal processor 2 and the inertial navigation signal processor 1 in real time, and process the correction data and the inertial navigation data via a fusion algorithm, to obtain a final accurate and real-time result for speed measurement and positioning. A device for safely and reliably performing real-time speed measurement and continuous positioning is provided according to the present disclosure, which includes an inertial navigation signal processor 1, a correction signal processor 2 and a fusion processor 3. The inertial navigation signal processor 1 is configured to detect inertial navigation data from an inertial navigation signal source arranged in a train. The correction signal processor 2 is configured to detect correction data from a correction signal source. The correction signal source includes a satellite signal source arranged in the train. The correction data includes satellite data. The correction signal processor 2 includes a satellite signal processor. The fusion processor 3 is configured to: determine a current speed and a current position of the train based on the inertial navigation data in a case that no correction data is detected; or correct the inertial navigation data by using the correction data and determine a current speed and a current position of the train based on the corrected inertial navigation data in a case that the correction data is detected.

It can be seen from the present disclosure that, the inertial navigation data and the correction data are both detected, and a way of obtaining the current speed and the current position of the train is determined by taking the inertial navigation data as a reference data depending on a result on whether the correction data is detected. In a case that the correction data is detected, the real-time speed measurement and continuous positioning can be performed safely and reliably based on the correction data and the inertial navigation data. Even in a case that no correction data is detected, the real-time speed measurement and continuous positioning can be performed safely and reliably based on the inertial navigation data. In this way, high stability, security and accuracy can be achieved.

Preferably, the correction signal processor 2 further includes an external signal processor. Accordingly, in a case that no satellite data is detected, the fusion processor 3 is configured to correct the inertial navigation data by using the correction data by performing the following steps of: correcting speed data in the inertial navigation data by using the speed data from the stator pole signal source, and/or correcting position data in the inertial navigation data by using the position data from the induction encoder. In a case that the satellite data is detected, the fusion processor 3 is configured to correct the inertial navigation data by using the correction data by performing the following steps of: correcting speed data in the inertial navigation data by using the speed data from the stator pole signal source and the satellite data, and/or correcting position data in the inertial navigation data by using the position data from the induction encoder and the satellite data.

The external signal processor is connected to various speed signal sources and position signal sources arranged in the train via connector sets, and receives speed information and position information and performs reliability analysis and fusion process on the received speed information and position information, to obtain several default outputs and decision outputs of speeds and positions, and transmits the default outputs and the decision outputs of the speeds and positions to the fusion processor 3. The speed signal source may be a stator pole signal source, and the position signal source may be an induction encoder.

In addition, the stator pole signal source and the induction encoder may be referred to as external signal sources.

Preferably, the device further includes a communication processor configured to transmit the current speed and the current position. The communication processor receives secure real-time speed information and continuous speed information from the fusion processor 3, and encodes the received secure real-time speed information and continuous speed information in response to a request from an external device, and transmits the encoded secure real-time speed information and continuous speed information to a communication interface circuit, thereby realizing data sharing.

The device for safely and reliably performing real-time speed measurement and continuous positioning according to the present disclosure is described below in combination with the following example, which includes the following steps 1 to 3.

Figure 32:
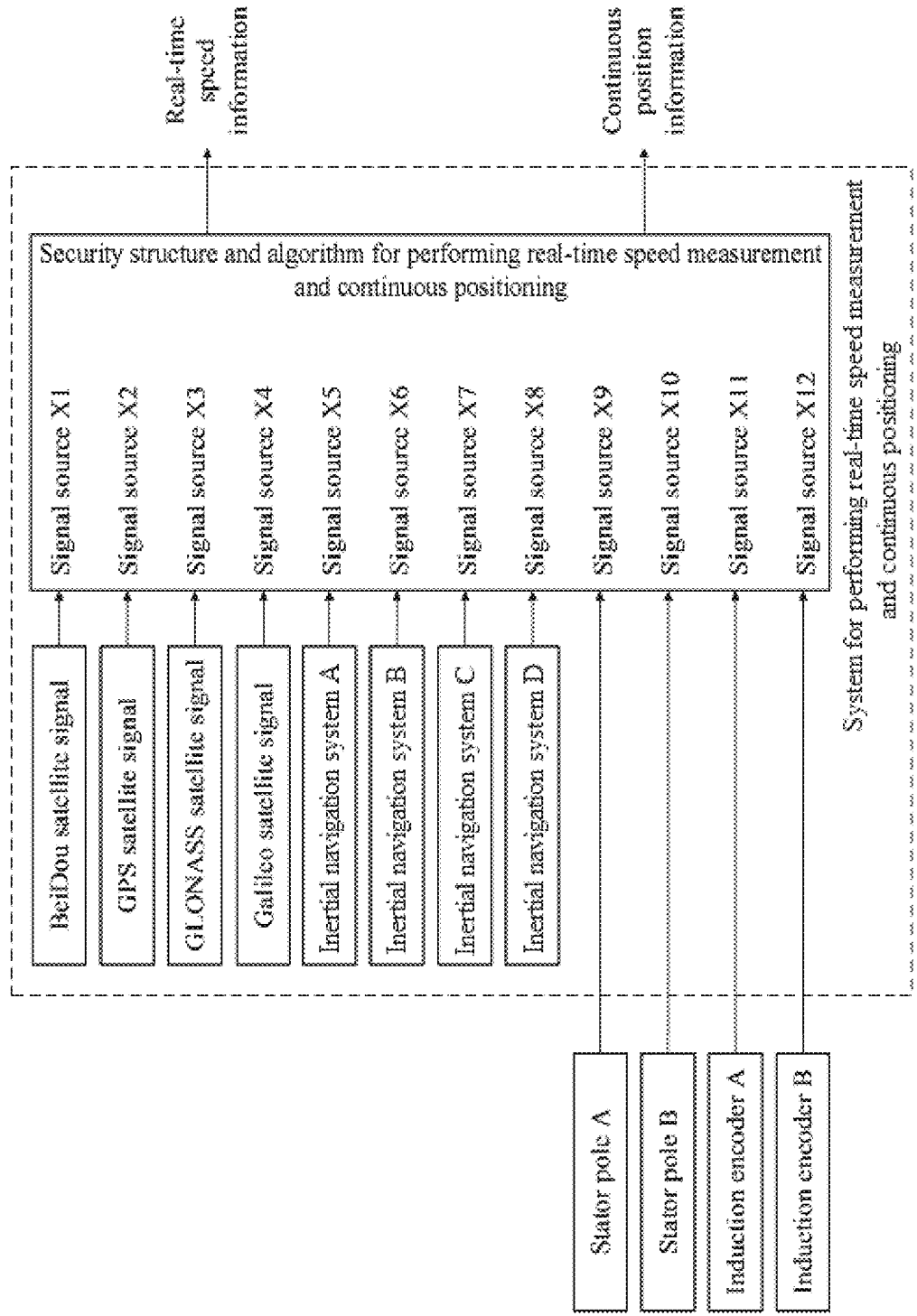
FIG. 32 is a schematic diagram showing a principle for safely and reliably performing real-time speed measurement and continuous positioning based on twelve signal sources according to the present disclosure.

In step 1, twelve independent signal sources for performing real-time speed measurement and continuous positioning are arranged in advance. Reference is made to FIG. 32, which is a schematic diagram showing a principle for safely and reliably performing real-time speed measurement and continuous positioning based on the twelve signal sources according to the present disclosure. In FIG. 32:

Signal source X1 is a BeiDou navigation satellite system and is configured to perform real-time speed measurement and continuous positioning;

Signal source X2 is a GPS navigation satellite system and is configured to perform real-time speed measurement and continuous positioning;

Signal source X3 is a GLONASS navigation satellite system and is configured to perform real-time speed measurement and continuous positioning;

Signal source X4 is a Galileo navigation satellite system and is configured to perform real-time speed measurement and continuous positioning;

Signal source X5 is an inertial navigation system A and is configured to perform real-time speed measurement and continuous positioning;

Signal source X6 is an inertial navigation system B and is configured to perform real-time speed measurement and continuous positioning;

Signal source X7 is an inertial navigation system C and is configured to perform real-time speed measurement and continuous positioning;

Signal source X8 is an inertial navigation system D and is configured to perform real-time speed measurement and continuous positioning;

Signal source X9 is a stator pole signal source A and is configured to perform real-time speed measurement;

Signal source X10 is a stator pole signal source B and is configured to perform real-time speed measurement;

Signal source X11 is an induction encoder signal source A and is configured to perform correction on continuous positioning; and Signal source X12 is an induction encoder signal source B and is configured to perform correction on continuous positioning.

In step 2, the twelve independent signal sources for performing real-time speed measurement and continuous positioning are arranged to form multiple two-out-of-three selecting security structures, multiple double two-vote-two security structures according to the security structure principle, to obtain reliable signal sources combined based on an self-adaptive security structure combination strategy, so as to obtain sixteen original outputs and sixteen decision outputs of real-time speeds and continuous positions by using a multi-source security algorithm.

Figure 33:
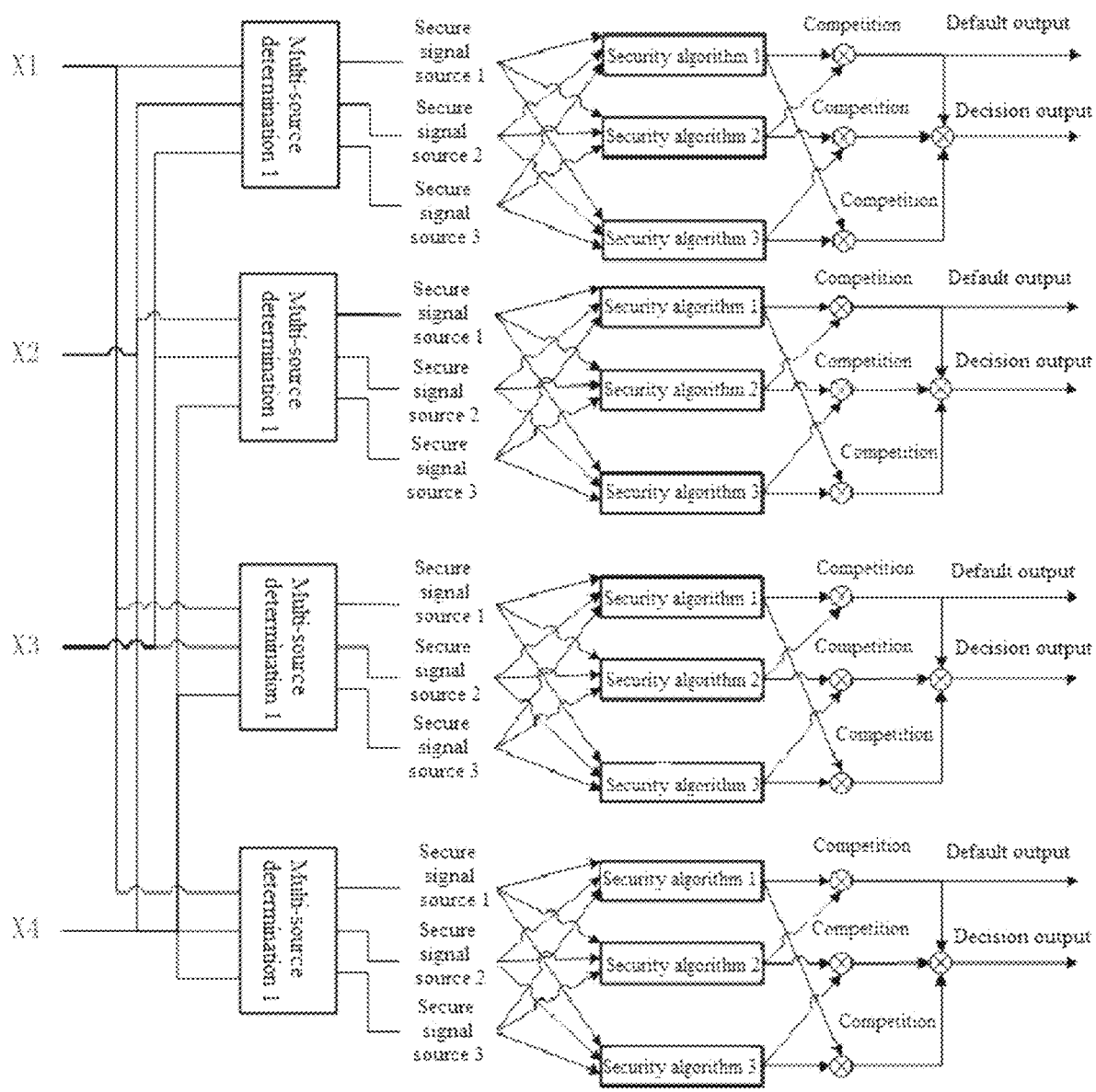
FIG. 33 is a schematic diagram showing a two-out-of-three selecting security structure including multiple satellite signal sources according to the present disclosure.

Specifically, reference is made to FIG. 33, which is a schematic diagram showing a two-out-of-three selecting security structure including multiple satellite signal sources according to the present disclosure. As shown in FIG. 33, signal sources X1, X2, X3 and X4 are arranged to form four two-out-of-three selecting security structures, that is, X1&X2&X3, X2&X3&X4, X3&X4&X1, and X4&X1&X2.

Figure 34:
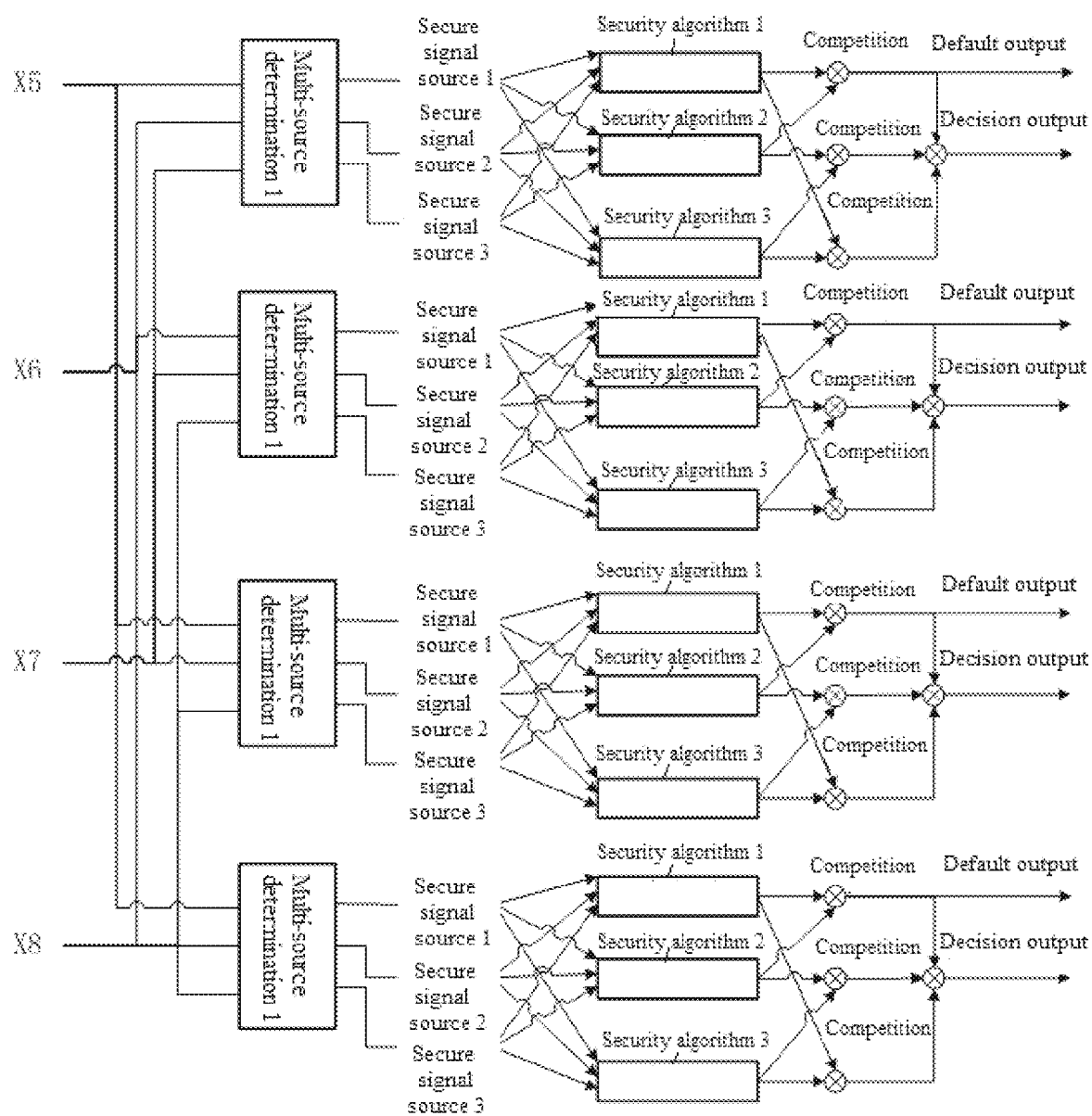
FIG. 34 is a schematic diagram showing a two-out-of-three selecting security structure including multiple inertial navigation signal sources according to the present disclosure.

Reference is made to FIG. 34, which is a schematic diagram showing a two-out-of-three selecting security structure including multiple inertial navigation signal sources according to the present disclosure. As shown in FIG. 34, signal sources X5, X6, X7 and X8 are arranged to form four two-out-of-three selecting security structures, that is, X5&X6&X7, X6&X7&X8, X7&X8&X5, and X8&X5&X6.

Figure 35:
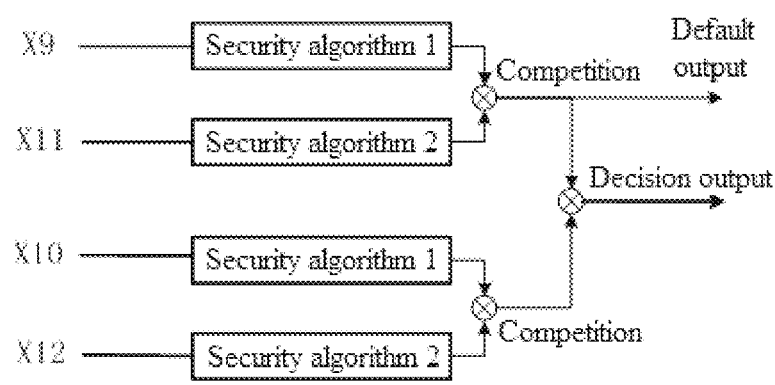
FIG. 35 is a schematic diagram showing a double two-vote-two security structure including multiple external signal sources according to the present disclosure.

Reference is made to FIG. 35, which is a schematic diagram showing a double two-vote-two security structure including multiple external signal sources according to the present disclosure. As shown in FIG. 35, signal sources X9, X10, X11 and X12 are arranged to form one double two-vote-two security structure, that is, X9&X11+X10&X12.

Figure 36:
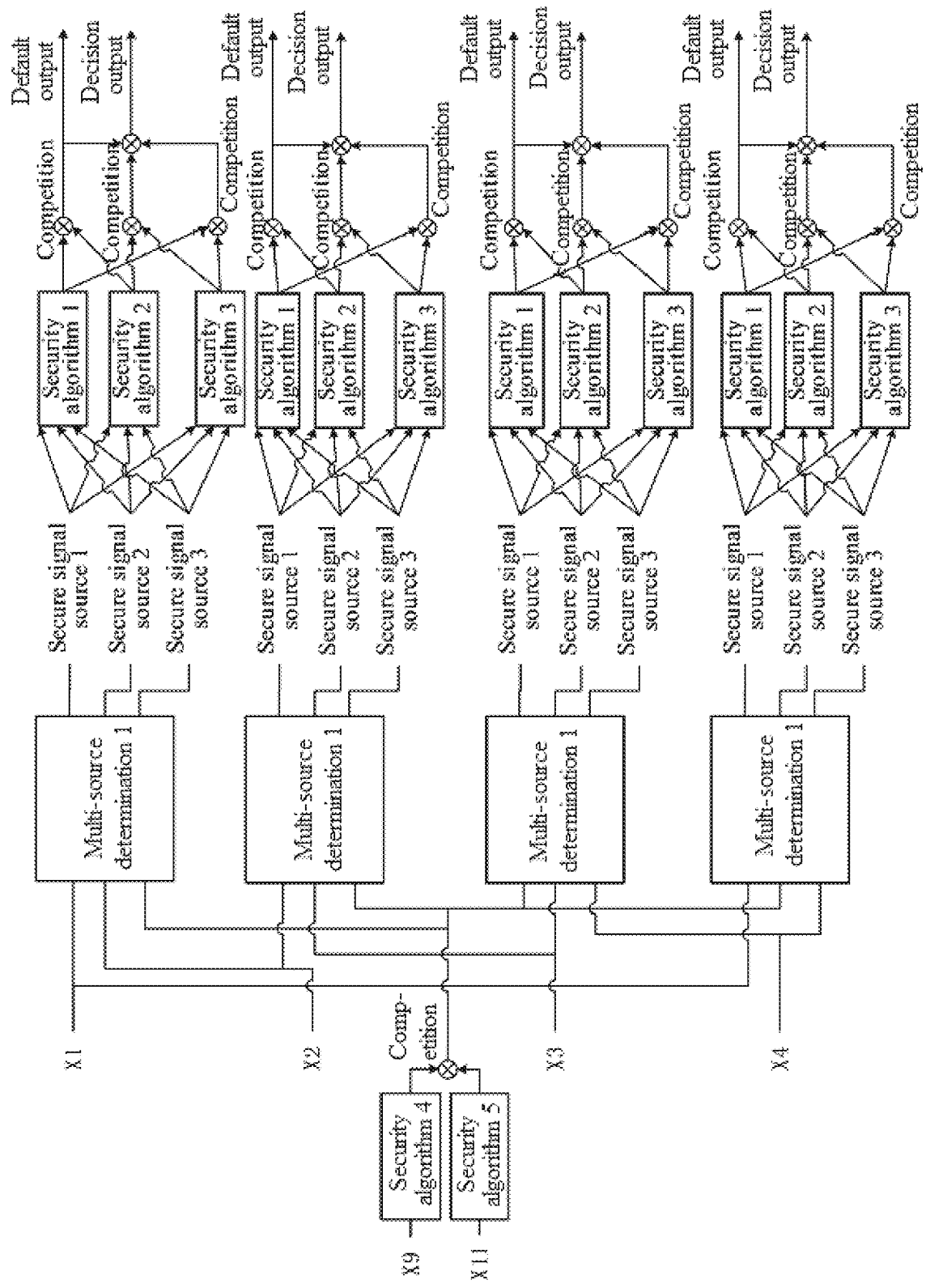
FIG. 36 is a schematic diagram showing a two-out-of-three selecting security structure including multiple satellite signal sources and multiple external signal sources according to the present disclosure.

Reference is made to FIG. 36, which is a schematic diagram showing a two-out-of-three selecting security structure including multiple satellite signal sources and multiple external signal sources according to the present disclosure. As shown in FIG. 36, signal sources X1, X2, X3, X4, X9 and X11 are arranged to form four two-out-of-three selecting security structures, that is, X1&X2&(X9&X11), X2&X3&(X9&X11), X3&X4&(X9&X11), and X4&X1&(X9&X11).

Figure 37:
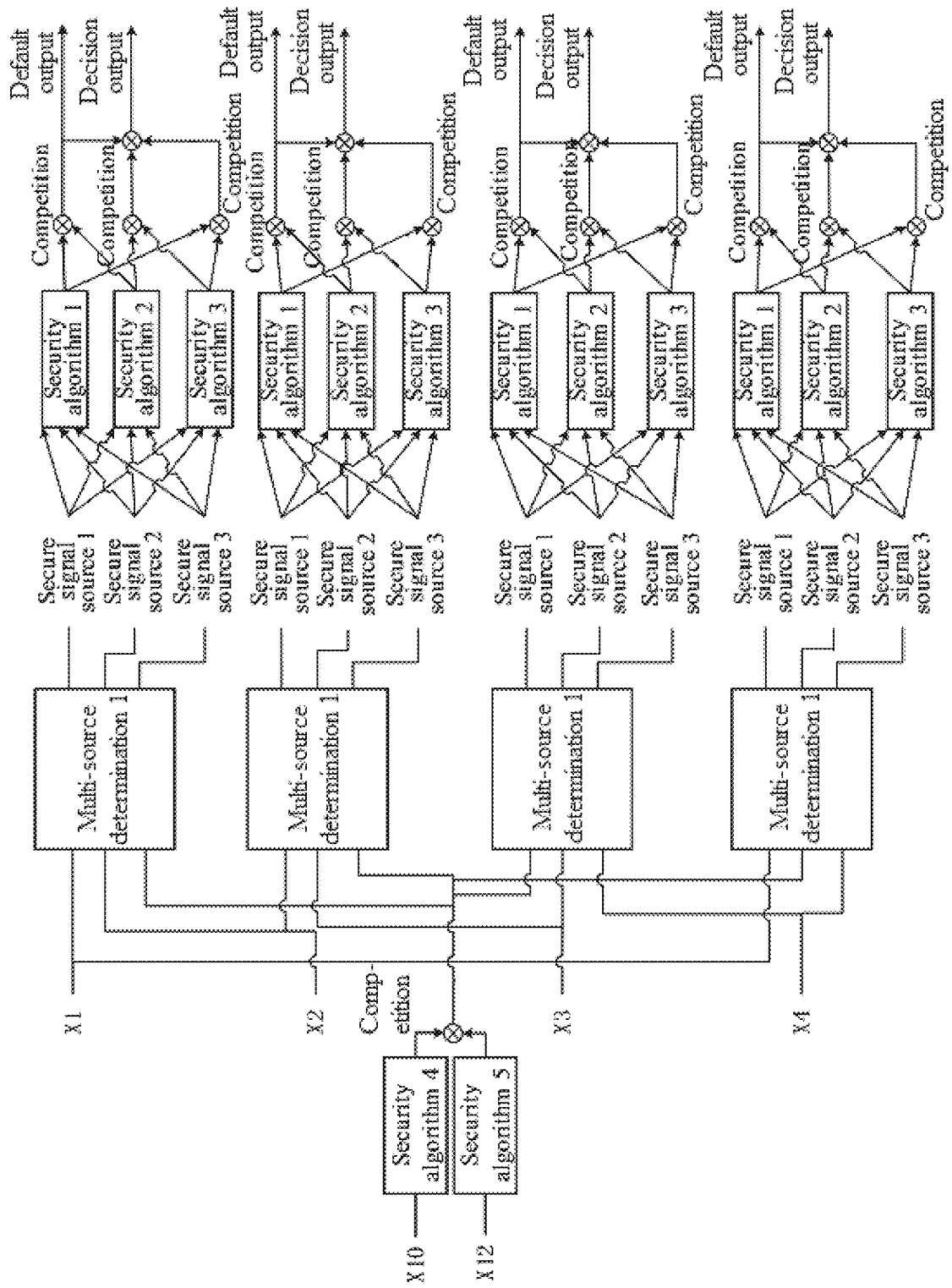
FIG. 37 is a schematic diagram showing a two-out-of-three selecting security structure including multiple inertial navigation signal sources and multiple external signal sources according to the present disclosure.

Reference is made to FIG. 37, which is a schematic diagram showing a two-out-of-three selecting security structure including multiple inertial navigation signal sources and multiple external signal sources according to the present disclosure. As shown in FIG. 37, signal sources X1, X2, X3, X4, X10 and X12 are arranged to form four two-out-of-three selecting security structures, that is, X1&X2&(X10&X12), X2&X3&(X10&X12), X3&X4&(X10&X12), X4&X1&(X10&X12).

In step 3, based on step 1 and step 2, a secondary determination is performed on the obtained sixteen default outputs and sixteen decision outputs through a fusion algorithm in combination with default outputs and decision outputs from the external signal sources, to output final real-time speed and continuous position of the train with security features.

For description of the device for safely and reliably performing real-time speed measurement and continuous positioning according to the present disclosure, reference may be made to the above embodiments of the method, which is not repeated herein.

Corresponding to the method and the device described above, a system for safely and reliably performing real-time speed measurement and continuous positioning is further provided according to the present disclosure. The system includes an inertial navigation signal source, a correction signal source and the above device for safely and reliably performing real-time speed measurement and continuous positioning.

Preferably, the number of the inertial navigation signal source is more than one, and the more than one inertial navigation signal source is arranged to form a two-out-of-three selecting security structure. The number of the satellite signal source is more than one, and the more than one satellite signal source is arranged to form a two-out-of-three security selecting structure.

Preferably, the number of the inertial navigation signal source is four, and the number of the satellite signal source is four.

Preferably, the four satellite signal sources are respectively implemented by a BeiDou satellite chipset, a GPS satellite chipset, a GLONASS satellite chipset and a Galileo satellite chipset.

Figure 38:
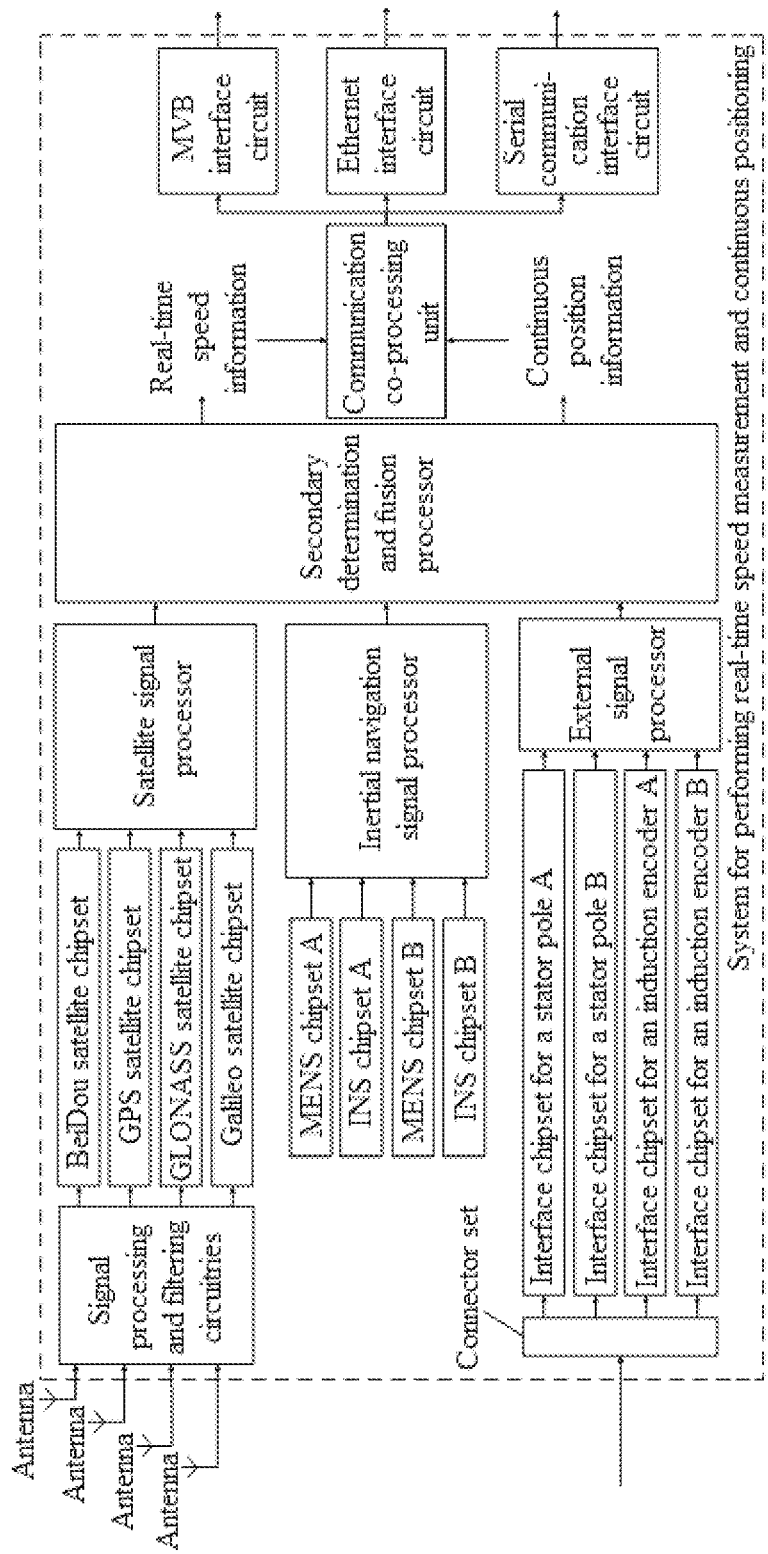
FIG. 38 is a schematic structural diagram showing a system for safely and reliably performing real-time speed measurement and continuous positioning according to the present disclosure.

Reference is made to FIG. 38, which is a schematic structural diagram showing a system for safely and reliably performing real-time speed measurement and continuous positioning according to the present disclosure.

The system for safely and reliably performing real-time speed measurement and continuous positioning according to the present disclosure is arranged in a high-speed train. In a case that the high-speed train is in a servicing state, the system is started, and a system initialization process is performed. In this case, in a case that satellite signals are available, the satellite signal processor searches satellite signal sources to select a satellite signal source having strong signals. Data is processed by a primary resolution and processing, and then is transmitted to the fusion processor through an interface. The inertial navigation signal processor detects attitude information of the train, such as the position information and the accelerated speed information, and transmits the information processed by a primary resolution and processing to the fusion processor through the interface. The external signal processor verifies and analyzes the received speed information and position information, and transmits data which is determined to be reliable to the fusion processor. The processor receives data from the satellite signal processor, the inertial navigation signal processor and the external signal processor, and performs algorithm decision and fusion calculation on the data by using a reference course intelligent iteration correction algorithm, and corrects the data by using the satellite data with reference to the inertial data.

The routes for high-speed trains are characterized in multiple tunnels, in which the system cannot receive any satellite signal, thus the positioning and the speed measurement are performed only by the inertial navigation signal processor. In this case, since there is no satellite data used to correct the inertial navigation data in real time, the inertial navigation signal processor cannot perform measurement accurately due to error accumulation. Therefore, it is required to correct the measurement error in real-time based on existing conditions.

Figure 39:
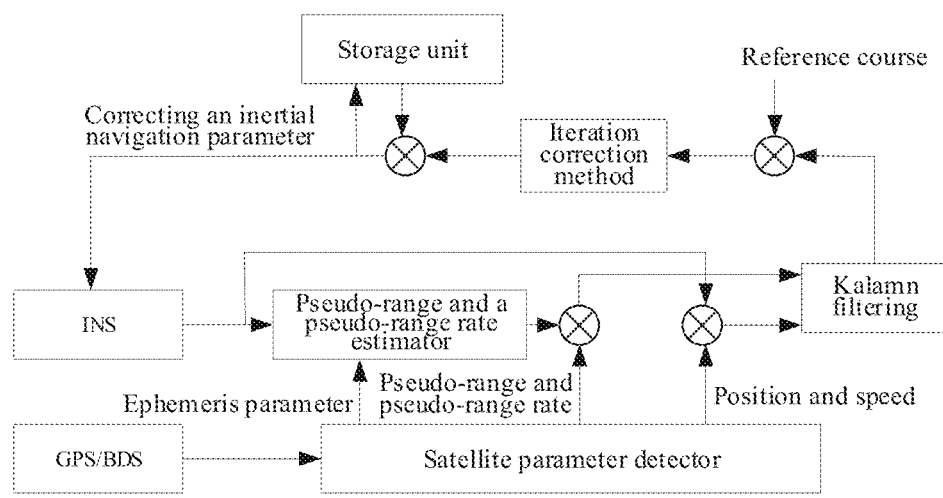
FIG. 39 is a schematic diagram showing a principle of a reference course iteration correction fusion algorithm according to the present disclosure.

A new reference course iteration correction fusion algorithm based on a hybrid coupling method, which is adopted according to the present disclosure, is described herein as an example. Reference is made to FIG. 39, which is a schematic diagram showing a principle of a reference course iteration correction fusion algorithm according to the present disclosure.

The hybrid coupling method has the same features of a small calculation amount and a simple structure as the loose coupling method, and also achieves the advantages of the tight coupling method in which navigation accuracy is ensured even in a case of a poor satellite signal. In a normal case, the inertial navigation signal is normally resolved, and position information and speed information are outputted directly, and the inertial navigation resolution error is corrected by using the satellite signal. In a case that the train travels in a mountainous area or an area with poor satellite signal, a pseudo-range and a pseudo-range rate of the train relative to a satellite are calculated by using ephemeris parameters and inertial navigation parameters, and the speed information and the position information are obtained through the Kalman filtering method. In a case that the train travels through a tunnel, the satellite signal is not detected, a current course of the train serves as a reference course and is stored. The inertial navigation course is acquired at a certain frequency, and is compared with the reference course. Difference between the inertial navigation course and the reference course is corrected based on an iteration rule, such that accumulative error is constantly corrected and eliminated.

For description of the system for safely and reliably performing real-time speed measurement and continuous positioning according to the present disclosure, reference may be made to the above embodiments of the method and the device, which is not repeated herein.

It is to be noted that terms of "include", "comprise" or any other variants are intended to be non-exclusive in the present disclosure. Therefore, a process, method, article or device including a series of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

With the description of the embodiments disclosed above, those skilled in the art may implement or use technical solutions of the present disclosure. Numerous modifications to the embodiments are apparent to those skilled in the art, and the general principles defined herein may be implemented in other embodiments without departing from the spirit or scope of the present disclosure. Therefore, the present disclosure may not be limited to the embodiments described herein, but should comply with the widest scope consistent with the principles and novel features disclosed herein.

The invention claimed is:

1. A method for safely and reliably performing real-time speed measurement and continuous positioning, comprising:
   detecting inertial navigation data from an inertial navigation signal source arranged in a train, and detecting correction data from a correction signal source, wherein the correction signal source comprises a satellite signal source arranged in the train, and the correction data comprises satellite data; and
   determining, in a case that no correction data is detected, a current speed and a current position of the train based on the inertial navigation data, and correcting, in a case that the correction data is detected, the inertial navigation data by using the correction data and determining a current speed and a current position of the train based on the corrected inertial navigation data,
   wherein the correction data further comprises: speed data from a stator pole signal source arranged on a rail for the train; and/or position data from an induction encoder arranged on the rail for the train, and wherein
   in the case that no satellite data is detected, the correcting the inertial navigation data by using the correction data comprises:
      correcting speed data in the inertial navigation data by using the speed data from the stator pole signal source; and/or correcting position data in the inertial navigation data by using the position data from the induction encoder, and
   in the case that the satellite data is detected, the correcting the inertial navigation data by using the correction data comprises:
   correcting speed data in the inertial navigation data by using the speed data from the stator pole signal source and the satellite data; and/or correcting position data in the inertial navigation data by using the position data from the induction encoder and the satellite data.

2. The method according to claim 1, further comprising: transmitting the current speed and the current position.

3. The method according to claim 1, wherein the correcting speed data in the inertial navigation data by using the speed data from the stator pole signal source and the satellite data comprises:
   correcting, at a predetermined correction time interval, the speed data in the inertial navigation data by using a corrected speed as an initial speed in a current speed data correcting process, wherein the corrected speed is obtained based on a current satellite signal speed and a current pole signal speed.

4. The method according to claim 1, wherein the correcting position data in the inertial navigation data by using the position data from the induction encoder and the satellite data comprises:
   correcting, at a predetermined correction time interval, the position data in the inertial navigation data by using a corrected position as an initial position in a current position data correcting process, wherein the corrected position is obtained based on a current satellite signal position and a current induction encoder position.

5. The method according to claim 1, wherein
   the number of the stator pole signal source is more than one, and the more than one stator pole signal source is arranged to form a double two-vote-two security structure; and/or
   the number of the induction encoder is more than one, and the more than one induction encoder is arranged to form a double two-vote-two security structure.

6. The method according to claim 1, wherein
   the number of the inertial navigation signal source is more than one, and the more than one inertial navigation signal source is arranged to form a two-out-of-three selecting security structure; and
   the number of the satellite signal source is more than one, and the more than one satellite signal source is arranged to form a two-out-of-three selecting security structure.

7. The method according to claim 6, wherein a security algorithm adopted in the two-out-of-three selecting security structure is a Kalman filtering method-based multi-source data fusion security algorithm for performing speed measurement and poisoning or an iteration correction method-based multi-source data fusion security algorithm for performing speed measurement and poisoning.

8. The method according to claim 6, wherein the number of the inertial navigation signal source is four, and the number of the satellite signal source is four.

9. The method according to claim 8, wherein the four satellite signal sources are respectively implemented by a BeiDou satellite chipset, a GPS satellite chipset, a GLONASS satellite chipset and a Galileo satellite chipset.

10. A device for safely and reliably performing real-time speed measurement and continuous positioning, comprising:
an inertial navigation signal processor configured to detect inertial navigation data from an inertial navigation signal source arranged in a train;
a correction signal processor configured to detect correction data from a correction signal source, wherein the correction signal source comprises a satellite signal source arranged in the train, the correction data comprises satellite data, and the correction signal processor comprises a satellite signal processor; and
a fusion processor configured to determine, in a case that no correction data is detected, a current speed and a current position of the train based on the inertial navigation data, and correct, in a case that the correction data is detected, the inertial navigation data by using the correction data and determine a current speed and a current position of the train based on the corrected inertial navigation data,
wherein
the correction signal processor further comprises an external signal processor, and
in the case that no satellite data is detected, the fusion processor is further configured to correct the inertial navigation data by using the correction data in the following steps of:
correcting speed data in the inertial navigation data by using the speed data from the stator pole signal source; and/or correcting position data in the inertial navigation data by using the position data from the induction encoder, and
in the case that the satellite data is detected, the fusion processor is further configured to correct the inertial navigation data by using the correction data in the following steps of:
correcting speed data in the inertial navigation data by using the speed data from the stator pole signal source and the satellite data; and/or correcting position data in the inertial navigation data by using the position data from the induction encoder and the satellite data.

11. The device according to claim 10, further comprising:
a communication processor configured to transmit the current speed and the current position.

12. A system for safely and reliably performing real-time speed measurement and continuous positioning, comprising:
an inertial navigation signal source arranged in a train;
a correction signal source; and
a device for safely and reliably performing real-time speed measurement and continuous positioning, wherein
the device for safely and reliably performing real-time speed measurement and continuous positioning, comprises:
an inertial navigation signal processor configured to detect inertial navigation data from the inertial navigation signal source;
a correction signal processor configured to detect correction data from the correction signal source, wherein the correction signal source comprises a satellite signal source arranged in the train, the correction data comprises satellite data, and the correction signal processor comprises a satellite signal processor; and
a fusion processor configured to determine, in a case that no correction data is detected, a current speed and a current position of the train based on the inertial navigation data, and correct, in a case that the correction data is detected, the inertial navigation data by using the correction data and determine a current speed and a current position of the train based on the corrected inertial navigation data,
wherein
the correction signal processor further comprises an external signal processor, and
in the case that no satellite data is detected, the fusion processor is further configured to correct the inertial navigation data by using the correction data in the following steps of:
correcting speed data in the inertial navigation data by using the speed data from the stator pole signal source; and/or correcting position data in the inertial navigation data by using the position data from the induction encoder, and
in the case that the satellite data is detected, the fusion processor is further configured to correct the inertial navigation data by using the correction data in the following steps of:
correcting speed data in the inertial navigation data by using the speed data from the stator pole signal source and the satellite data; and/or correcting position data in the inertial navigation data by using the position data from the induction encoder and the satellite data.

13. The system according to claim 12, wherein
the number of the inertial navigation signal source is more than one, and the more than one inertial navigation signal source is arranged to form a two-out-of-three selecting security structure; and
the number of the satellite signal source is more than one, and the more than one satellite signal source is arranged to form a two-out-of-three selecting security structure.

14. The system according to claim 13, wherein the number of the inertial navigation signal source is four, and the number of the satellite signal source is four.

15. The system according to claim 14, wherein the four satellite signal sources are respectively implemented by a BeiDou satellite chipset, a GPS satellite chipset, a GLONASS satellite chipset and a Galileo satellite chipset.

* * * * *